(12) United States Patent
Hanioka et al.

(10) Patent No.: US 12,506,420 B2
(45) Date of Patent: Dec. 23, 2025

(54) CONTROL UNIT FOR POWER CONVERTER, AND POWER CONVERSION APPARATUS

(71) Applicant: Mitsubishi Electric Corporation, Tokyo (JP)

(72) Inventors: Shota Hanioka, Tokyo (JP); Masahiro Iezawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 189 days.

(21) Appl. No.: 18/682,117

(22) PCT Filed: Sep. 6, 2021

(86) PCT No.: PCT/JP2021/032634
§ 371 (c)(1),
(2) Date: Feb. 8, 2024

(87) PCT Pub. No.: WO2023/032195
PCT Pub. Date: Mar. 9, 2023

(65) Prior Publication Data
US 2025/0125744 A1 Apr. 17, 2025

(51) Int. Cl.
*H02M 7/487* (2007.01)
*H02M 1/00* (2006.01)
(Continued)

(52) U.S. Cl.
CPC ......... *H02M 7/487* (2013.01); *H02M 1/0025* (2021.05); *H02M 1/0048* (2021.05); *H02M 1/385* (2021.05); *H02M 7/5395* (2013.01)

(58) Field of Classification Search
CPC ............. H02M 1/0003; H02M 1/0009; H02M 1/0012; H02M 1/0025; H02M 1/0032;
(Continued)

(56) References Cited

U.S. PATENT DOCUMENTS

| 2010/0039056 A1* | 2/2010 | Kobayashi | H02M 7/48 318/400.35 |
| 2013/0163301 A1* | 6/2013 | Fujii | H02M 7/487 363/97 |

(Continued)

FOREIGN PATENT DOCUMENTS

| JP | 5386640 B2 | 1/2014 |
| JP | 6586349 B2 | 10/2019 |

OTHER PUBLICATIONS

International Search Report and Written Opinion issued on Nov. 2, 2021, in International Patent Application No. PCT/JP2021/032634, filed on Sep. 6, 2021, 08 pages including partial English Translation.
(Continued)

*Primary Examiner* — Thienvu V Tran
*Assistant Examiner* — Shahzeb K Ahmad
(74) *Attorney, Agent, or Firm* — XSENSUS LLP

(57) ABSTRACT

A controlling circuitry of a power converter performs switchover control for, on the basis of a level specification signal, switching between a 3-level operation mode of outputting AC voltage composed of 3-level voltages at a positive side and a negative side of a DC circuit and a voltage-division point of DC voltage between the positive side and the negative side of the DC circuit by performing ON/OFF control of semiconductor elements, and a 2-level operation mode of outputting AC voltage composed of 2-level voltages at the positive side and the negative side of the DC circuit by performing ON/OFF control of the semiconductor elements, and switches a compensation value for compensating error between a voltage command and AC voltage, between a case of the 2-level operation mode and a case of the 3-level operation mode.

20 Claims, 13 Drawing Sheets

(51) Int. Cl.
*H02M 1/38* (2007.01)
*H02M 7/5395* (2006.01)

(58) Field of Classification Search
CPC .... H02M 1/0048; H02M 1/0054; H02M 1/12;
H02M 1/36; H02M 1/38; H02M 1/385;
H02M 7/42; H02M 7/48; H02M 7/483;
H02M 7/487; H02M 7/66–81
See application file for complete search history.

(56) References Cited

U.S. PATENT DOCUMENTS

| | | | | |
|---|---|---|---|---|
| 2021/0091662 A1* | 3/2021 | Tawada | ............... | H02M 7/5395 |
| 2021/0359593 A1* | 11/2021 | Tsuruma | ........... | H02M 7/53871 |
| 2021/0384825 A1* | 12/2021 | Karadi | .................. | H02M 3/157 |
| 2022/0029529 A1* | 1/2022 | Chen | ..................... | H02M 7/797 |

OTHER PUBLICATIONS

Haring et al., "Efficiency and Cost Comparison of B6 and Hybrid ANPC Converters for Traction Drives", IEEE EPE2020, Mar. 3, 2021, pp. 1-10.

Satpathy et al., "Comprehensive Loss Analysis of Two-level and Three-level Inverter for Electric Vehicle Using Drive Cycle Models", IEEE 2020, Mar. 3, 2021, pp. 2017-2024.

\* cited by examiner

CONTROL UNIT FOR POWER CONVERTER, AND POWER CONVERSION APPARATUS

CROSS-REFERENCE TO RELATED APPLICATION

This application is a national stage application, pursuant to 35 U.S.C. § 371, of International Patent Application No. PCT/JP2021/032634, filed Sep. 6, 2021, the entire contents of which are incorporated herein by reference.

TECHNICAL FIELD

The present disclosure relates to a control unit for a power converter, and a power conversion device.

BACKGROUND ART

A power converter which converts DC power to AC power is used for driving an AC electric motor, for example. Such a power converter may have a configuration of performing pulse width modulation (PWM) control in which AC voltage composed of voltages having two different potentials of a DC power supply unit is outputted (hereinafter, referred to as 2-level operation), or may have a configuration of performing PWM control in which AC voltage composed of voltages having three different potentials of a DC power supply unit is outputted (hereinafter, referred to as 3-level operation).

The power converter that performs 3-level operation has a more complicated configuration than the power converter that performs 2-level operation, but has an advantage that harmonic current, ripple current, and the like which adversely influence the device can be reduced. On the other hand, in the power converter that performs 2-level operation, the number of semiconductor elements to which current is applied can be decreased as compared to the power converter that performs 3-level operation, thus having an advantage that conduction loss can be reduced.

Accordingly, in order to perform high-efficiency power conversion utilizing the advantages of the respective power converters that perform 2-level operation and 3-level operation, disclosed is a control unit for a power converter, which includes a power converter having a configuration capable of switching between 2-level operation and 3-level operation, and switches between 2-level operation and 3-level operation in accordance with the operation state of the power converter, as shown below.

This conventional control unit for a power converter includes, with the power converter capable of 3-level operation or 2-level operation, a comparison circuit which compares a switchover reference value and a judgment element relevant to loss in the power converter, and when a difference arises therebetween, outputs a judgment command, a judgment circuit which, when the judgment command is inputted from the comparison circuit, judges the magnitude relationship between the judgment element and the switchover reference value, and when the judgment element is equal to or greater than the switchover reference value, outputs a switchover command for 2-level operation, and a switchover circuit which, when the switchover command for 2-level operation is inputted from the judgment circuit, turns off the AC switches and sequentially turns on the valve devices of the arms, so that the power converter comes into a 2-level operation state. That is, whether or not the judgment element relevant to loss of the power converter, e.g., DC current detected by a DC current detector, is equal to or greater than the switchover reference value (or the DC current is smaller than the switchover reference value), is judged.

As a result, when the DC current is equal to or smaller than the switchover reference value, 3-level operation is performed, and when the DC current is greater than the switchover reference value, 2-level operation is performed. Thus, operation with higher conversion efficiency is selected between the 3-level operation and the 2-level operation, to perform power conversion (see, for example, Patent Document 1).

CITATION LIST

Patent Document

Patent Document 1: Japanese Patent No. 5386640 (paragraphs [0008] to [0026], FIG. 1 to FIG. 4)

SUMMARY OF THE INVENTION

Problem to be Solved by the Invention

The above conventional control unit for the power converter switches between 3-level operation and 2-level operation using loss as a judgment reference. That is, when bus current which is a judgment element relevant to loss in the power converter is greater than a threshold, the operation is switched to 2-level operation, and when the bus current is smaller than the threshold, the operation is switched to 3-level operation, whereby loss of the power converter can be reduced. However, in such a power converter, voltage error between a voltage command and output voltage before and after switchover between 2-level operation and 3-level operation might not be suppressed. In this case, there is a problem that variation in current, variation in torque, and the like occur due to voltage error before and after level switchover.

The present disclosure has been made to solve the above problem, and an object of the present disclosure is to provide a control unit for a power converter, which can suppress voltage error due to switchover between 2-level operation and 3-level operation and thus can suppress variation in current, variation in torque, and the like, and a power conversion device including the control unit and the power converter.

Means to Solve the Problem

A control unit for a power converter according to the present disclosure is a control unit for a power converter which has a plurality of semiconductor elements for controlling conduction and interruption on a power supply path, between a DC circuit unit and an AC circuit unit, and converts DC power from the DC circuit unit to AC power for the AC circuit unit. The control unit has a 3-level operation mode of outputting AC voltage composed of 3-level voltages at a positive side and a negative side of the DC circuit unit and a voltage-division point of DC voltage between the positive side and the negative side of the DC circuit unit by performing ON/OFF control of the semiconductor elements on the basis of an output voltage command, and a 2-level operation mode of outputting AC voltage composed of 2-level voltages at the positive side and the negative side of the DC circuit unit by performing ON/OFF control of the semiconductor elements on the basis of the output voltage command. The control unit performs switchover control for switching between the 2-level operation mode and the 3-level operation mode on the basis of a level specification signal, and in the switchover control, switches a compensation value for compensating error between the voltage command and AC voltage, between a case of the 2-level operation mode and a case of the 3-level operation mode.

A power conversion device according to the present disclosure includes: the control unit for the power converter, configured as described above; and the power converter. The power converter includes a first arm for at least one phase of the AC circuit unit, the first arm being connected in parallel between the positive side and the negative side of the DC circuit unit and being formed by connecting a first semiconductor switch and a second semiconductor switch as the semiconductor elements in series, and a second arm which has a bidirectional switch formed by the semiconductor element and is connected between an AC terminal and the voltage-division point of the DC circuit unit, the AC terminal being a connection point of the first semiconductor switch and the second semiconductor switch. The bidirectional switch has diodes and third semiconductor switches as the semiconductor elements, and is configured such that the third semiconductor switches to which the diodes are connected in anti-parallel are connected in anti-series or series units each formed by connecting the diode and the third semiconductor switch in series are connected in anti-parallel. The control unit performs ON/OFF control of the semiconductor elements by performing PWM on the basis of the voltage command and a carrier signal, and performs the switchover control in synchronization with a set timing in the carrier signal.

Effect of the Invention

The control unit for the power converter and the power conversion device according to the present disclosure can suppress voltage error due to switchover between 2-level operation and 3-level operation and thus can suppress variation in current, variation in torque, and the like.

DESCRIPTION OF EMBODIMENTS

Embodiment 1

Figure 1:
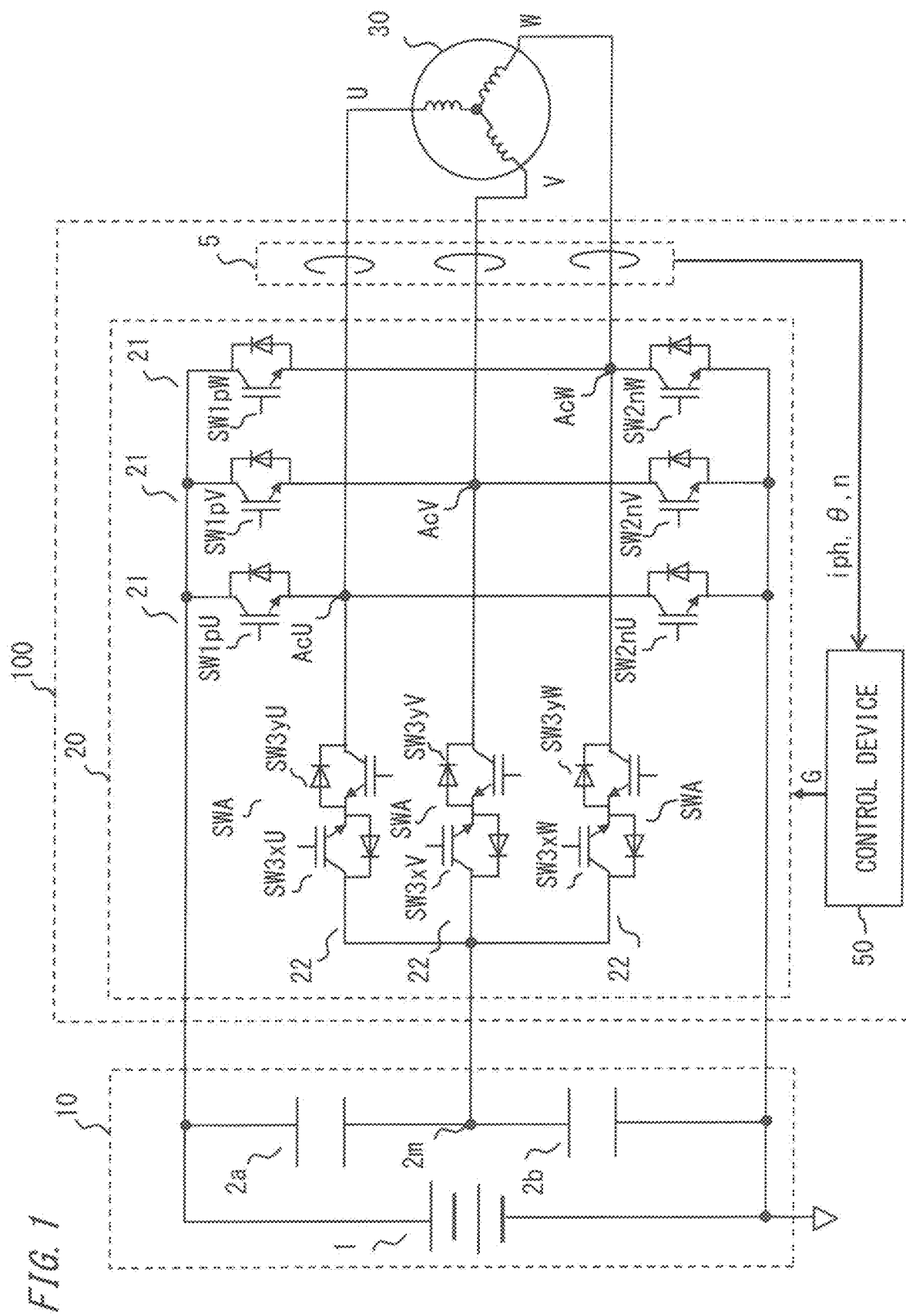
FIG. 1 is a block diagram showing a schematic configuration of a power conversion device according to embodiment 1.

FIG. 1 is a block diagram showing a schematic configuration of a power conversion device 100 according to embodiment 1.

In the present embodiment, an AC rotary machine driving system in which a control device is applied to a power converter having a three-phase inverter configuration for supplying power to an AC rotary machine, will be described.

A power conversion device 100 which is the AC rotary machine driving system includes a power converter 20 as a power conversion unit which converts DC power to AC power, a control device 50 as a control unit which controls the power converter 20, and a detection unit 5 which detects an operation state of the power converter 20.

The power conversion device 100 is provided between a DC circuit unit 10 and an AC rotary machine 30 as an AC circuit unit, and converts DC power inputted from the DC circuit unit 10, to AC power for the AC rotary machine 30.

The AC rotary machine 30 is an electric motor driven with three-phase AC, and is an induction machine, a permanent magnet synchronous machine, or the like.

The DC circuit unit 10 includes a DC voltage source 1, a capacitor 2a as a first DC power supply unit, and a capacitor 2b as a second DC power supply unit.

The capacitors 2a, 2b are connected in series between the positive side and the negative side of the DC voltage source 1, thereby dividing the DC voltage Vdc between the positive side and the negative side of the DC voltage source 1 and each having a potential of Vdc/2. Thus, the DC circuit unit 10 has three potentials, i.e., voltage 0 [V] at the negative side of the DC circuit unit 10, voltage Vdc/2 [V] at a voltage-division point 2m which is a connection part between the capacitor 2a and the capacitor 2b, and voltage Vdc [V] at the positive side.

In the present embodiment, the DC circuit unit 10 having the configuration in which voltage of the DC voltage source 1 is divided by the capacitors 2a, 2b, is shown, but the DC circuit unit 10 is not limited to this configuration. For example, the DC circuit unit 10 may be configured such that two DC power supplies each capable of outputting voltage of Vdc/2 [V] are connected in series. The DC circuit unit 10 may have any configuration that has three different potentials and is capable of outputting voltages having these potentials.

The power converter 20 includes switching elements SW1 (SW1$p$U, SW1$p$V, SW1$p$W), SW2 (SW2$n$U, SW2$n$V, SW2$n$W), and SW3 (SW3$x$U, SW3$x$V, SW3$x$W, SW3$y$U, SW3yV, SW3yW) as semiconductor elements for controlling conduction and interruption on power supply paths.

It suffices that the switching elements SW (SW1, SW2, SW3) have switching functions, and in the present embodiment, insulated gate bipolar transistors (IGBTs) are used. In addition, diodes as semiconductor elements for controlling conduction and interruption on power supply paths are connected in anti-parallel to the switching elements SW.

The power converter 20 includes first arms 21 for respective phases which are formed by connecting, in series, switching elements SW1 (SW1pU, SW1pV, SW1pW) as first semiconductor switches and switching elements SW2 (SW2nU, SW2nV, SW2nW) as second semiconductor switches, respectively, and the first arms 21 are connected in parallel between the positive side and the negative side of the DC circuit unit 10.

In the first arms 21, connection points between the switching elements SW1 (SW1pU, SW1pV, SW1pW) connected to the positive side of the DC circuit unit 10 and the switching elements SW2 (SW2nU, SW2nV, SW2nW) connected to the negative side of the DC circuit unit 10, serve as AC terminals AcU, AcV, AcW for respective phases for outputting AC voltage.

Further, the power converter 20 includes second arms 22 having bidirectional switches SWA, between the voltage-division point 2m of the DC circuit unit 10 and the AC terminals Acu, Acv, Acw for respective phases.

The bidirectional switches SWA are formed by connecting, in anti-series, switching elements SW3x (SW3xU, SW3xV, SW3xW) as third semiconductor switches and switching elements SW3y (SW3yU, SW3yV, SW3yW) as third semiconductor switches, respectively.

Thus, the switching elements SW1 (SW1pU, SW1pV, SW1pW) forming upper arms of the first arms 21 are connected between Vdc [V] at a high potential and the AC terminals Ac (AcU, AcV, AcW). The switching elements SW2 (SW2pU, SW2pV, SW2pW) forming lower arms of the first arms 21 are connected between 0 [V] at a low potential and the AC terminals Ac (AcU, AcV, AcW).

Since the power converter 20 is configured as described above, semiconductor elements having withstand voltage greater than the voltage Vdc (V) need to be used for the switching elements SW1 (SW1pU, SW1pV, SW1pW) and the switching elements SW2 (SW2pU, SW2pV, SW2pW).

On the other hand, in the second arms 22, semiconductor elements having withstand voltage greater than the potential Vdc/2 may be used for the switching elements SW3 (SW3xU, SW3xV, SW3xW, SW3yU, SW3yV, SW3yW) forming the bidirectional switches SWA connected to the voltage-division point 2m having the potential Vdc/2. Therefore, elements that are small in loss and low in cost can be used for the switching elements SW3.

The detection unit 5 detects phase current iph for each AC phase, a rotor position θ of the AC rotary machine 30, a rotation speed n, or the like as an element indicating the operation state of the power converter 20, and outputs the detected element to the control device 50.

Hereinafter, control by the control device 50 which controls the power converter 20 configured as described above will be described.

Figure 2:
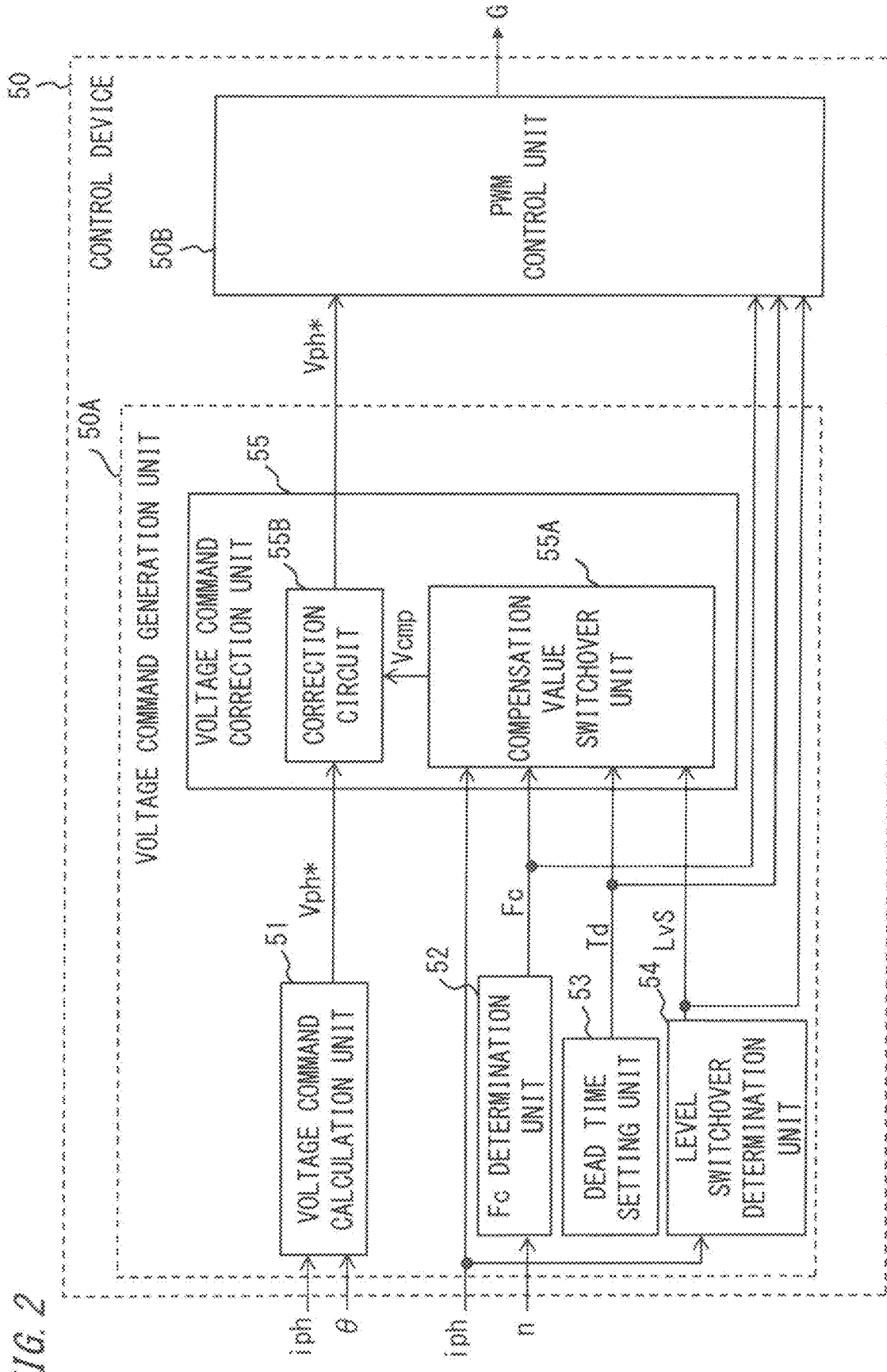
FIG. 2 is a function block diagram of a control device showing a compensation method for a voltage command and a generation method for switching signals, according to embodiment 1.

FIG. 2 is a function block diagram of the control device 50 according to embodiment 1, and shows a compensation method for a voltage command Vph* which is a major part of the present embodiment, and a generation method for switching signals G.

Figure 3:
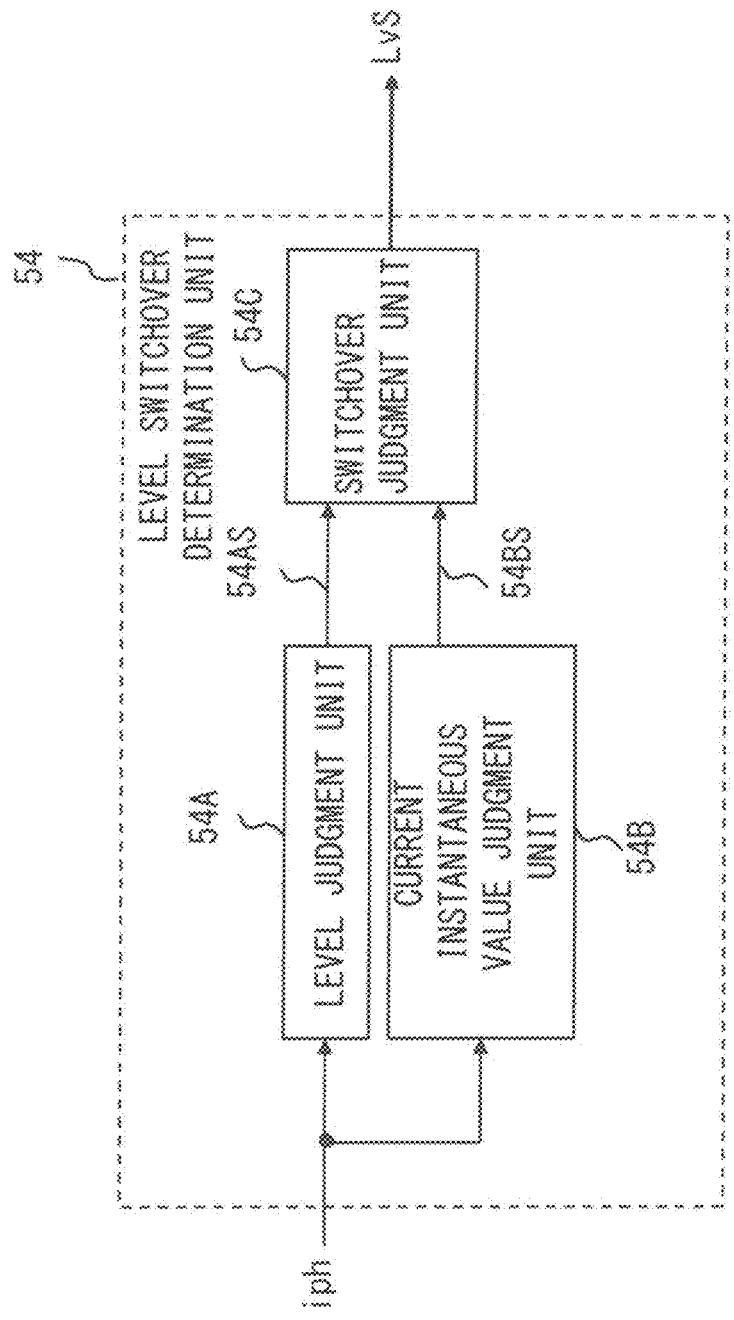
FIG. 3 is a function block diagram showing a configuration of a level switchover determination unit included in the control device according to embodiment 1.

FIG. 3 is a function block diagram showing a configuration of a level switchover determination unit 54 included in the control device 50 according to embodiment 1.

Figure 4:
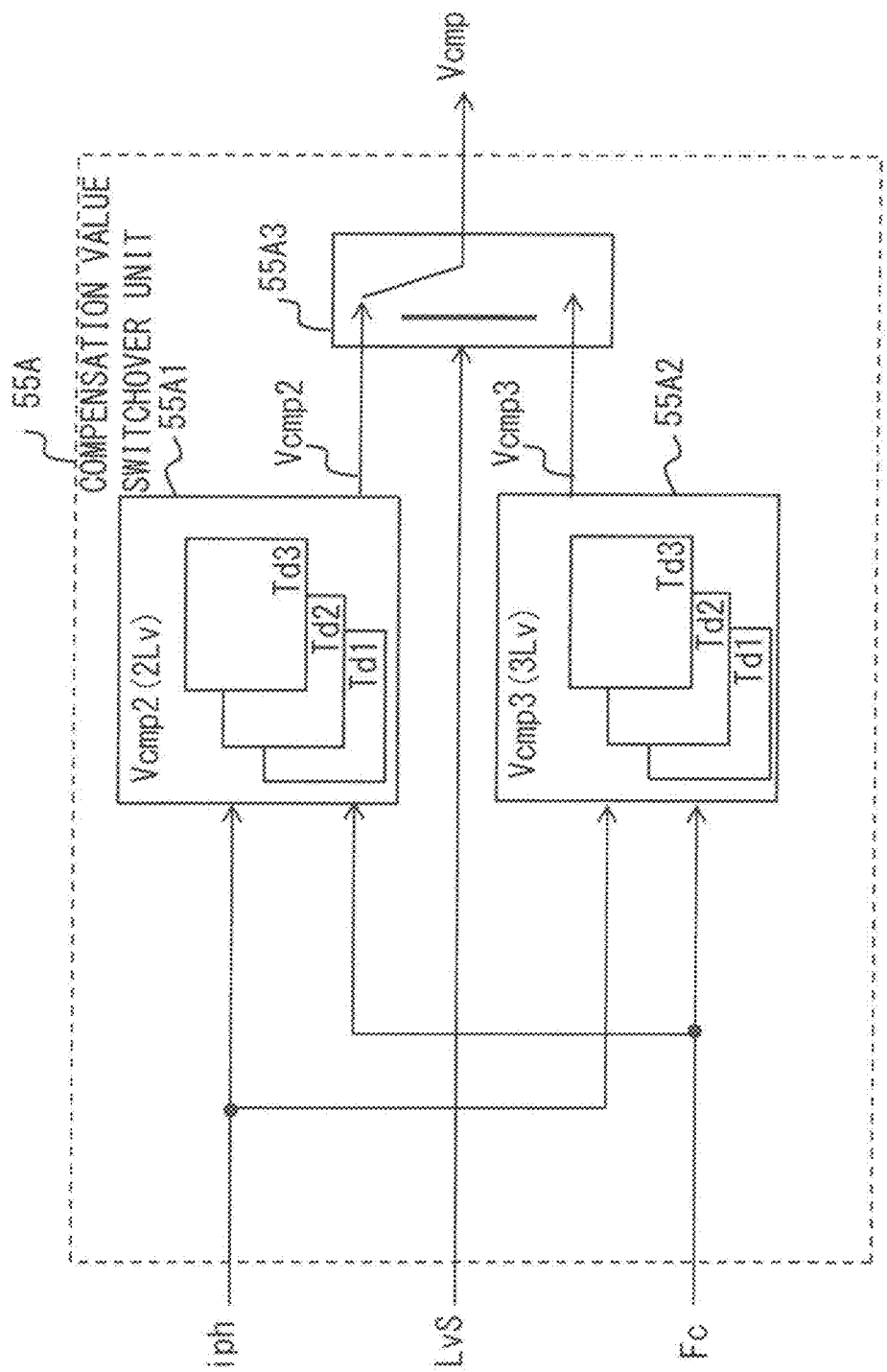
FIG. 4 is a function block diagram showing a configuration of a compensation value switchover unit included in the control device according to embodiment 1.

FIG. 4 is a function block diagram showing a configuration of a compensation value switchover unit 55A included in the control device 50 according to embodiment 1.

As shown in FIG. 2, the control device 50 includes a voltage command generation unit 50A and a PWM control unit 50B.

The voltage command generation unit 50A generates the voltage command Vph* for each AC phase, a signal for specifying a carrier frequency Fc, a signal for specifying a dead time Td, and a level specification signal LvS described later, and outputs them to the PWM control unit 50B at the subsequent stage.

The PWM control unit 50B performs PWM control on the basis of the voltage command Vph* for each AC phase, the carrier frequency Fc, the dead time Td, and the level specification signal LvS inputted from the voltage command generation unit 50A, and generates and outputs the switching signals G for controlling the switching elements SW of the power converter 20.

First, the detailed configuration of the voltage command generation unit 50A and control therein will be described.

The voltage command generation unit 50A includes a voltage command calculation unit 51, a carrier frequency (Fc) determination unit 52, a dead time setting unit 53, the level switchover determination unit 54, and a voltage command correction unit 55.

In accordance with commands of speed, torque, and the like for the AC rotary machine 30 from a host control device (not shown), the voltage command calculation unit 51 calculates voltage commands Vph* (Vu*, Vv*, Vw*) for respective AC phases on the basis of the phase currents iph for respective AC phases, the rotor position θ of the AC rotary machine 30, and the like detected by the detection unit 5. The voltage commands Vph* for respective phases are outputted as values normalized with Vdc/2.

In accordance with a torque command from the host control device (not shown), the carrier frequency (Fc) determination unit 52 determines the carrier frequency Fc to be used in PWM control so as to minimize loss in the power converter 20 and the AC rotary machine 30, on the basis of the rotation speed n of the AC rotary machine 30 detected by the detection unit 5.

For the switching elements SW forming the first arm 21 for each phase, the dead time setting unit 53 sets a dead time Td which is a time during which the switching elements SW1, SW2 subjected to complementary switching are prohibited from turning on at the same time, in order to prevent the switching elements SW1, SW2 from being short-circuited.

The level switchover determination unit 54 generates a level specification signal LvS for specifying whether to set 2-level operation or 3-level operation as the operation mode of the power converter 20. Hereinafter, a generation method for the level specification signal LvS will be described.

The level switchover determination unit 54 includes a level judgment unit 54A, a current instantaneous value judgment unit 54B, and a switchover judgment unit 54C, as shown in a configuration diagram in FIG. 3.

On the basis of the detected phase current iph for each AC phase, the level judgment unit 54A calculates an effective value irms of the phase current iph.

Then, when the effective value irms of the phase current iph is greater than a predetermined threshold ith1, the level judgment unit 54A outputs a specification signal 54AS so as to specify the operation mode of the power converter 20 as 2-level operation. On the other hand, when the effective value irms of the phase current iph is equal to or smaller than the predetermined threshold ith1, the level judgment unit 54A outputs the specification signal 54AS so as to specify the operation mode of the power converter 20 as 3-level operation.

As described above, the level judgment unit 54A judges whether to set 2-level operation or 3-level operation as the operation mode of the power converter 20, in accordance with the magnitude of the effective value irms of the phase current iph which is an element indicating the operation state of the power converter 20. Thus, the operation mode according to loss in the power converter 20 is selected.

As an element indicating the operation state of the power converter 20, the effective value irms of the phase current iph is used, but another element may be used. As an element indicating the operation state of the power converter 20, the level judgment unit 54A may use the rotation speed or torque of the AC rotary machine 30, for example.

When the detected instantaneous values of the phase currents iph for all the three phases are equal to or greater than a predetermined threshold ith2, the current instantaneous value judgment unit 54B outputs "1" as an output signal 54BS, and when the instantaneous values are smaller than the threshold ith2, the current instantaneous value judgment unit 54B outputs "0" as the output signal 54BS. In the present embodiment, the threshold ith2 is set to be greater than 0 by a set value. That is, in the present embodiment, the output signal 54BS becomes "1" only in a phase range where the instantaneous values of the phase currents iph for all the three phases are outside the first threshold range centered at 0.

When the output signal 54BS outputted from the current instantaneous value judgment unit 54B is "1", the switchover judgment unit 54C updates the level specification signal LvS by the specification signal 54AS outputted from the level judgment unit 54A and specifying the operation mode, and outputs the level specification signal LvS. As described later in detail, update of the level specification signal LvS is performed in synchronization with a set timing in a carrier wave C as a carrier signal.

When the output signal 54BS outputted from the current instantaneous value judgment unit 54B is "0", the switchover judgment unit 54C does not update the level specification signal LvS. Thus, in the present embodiment, update of the level specification signal LvS is performed only in a phase range where the instantaneous values of the phase currents iph for all the three phases are outside the first threshold range centered at 0.

Returning to FIG. 2, the voltage command correction unit 55 will be described.

The voltage command correction unit 55 performs switchover control for switching a compensation value Vcmp for compensating error between AC voltage and the voltage command Vph* for each phase, between when the operation mode of the power converter 20 is 2-level operation and when the operation mode is 3-level operation. Further, in the switchover control, the voltage command correction unit 55 corrects the voltage command Vph* outputted from the voltage command calculation unit 51, using the compensation value Vcmp corresponding to the operation mode, and outputs the corrected voltage command Vph* to the PWM control unit 50B at the subsequent stage. The control in the voltage command correction unit 55 will be described more specifically.

As shown in FIG. 2, the voltage command correction unit 55 includes the compensation value switchover unit 55A and a correction circuit 55B.

The compensation value switchover unit 55A includes a storage unit 55A1 and a storage unit 55A2 having storage areas, and a selector 55A3, as shown in the schematic configuration diagram in FIG. 4.

Here, the compensation value Vcmp in the present embodiment is a compensation value for suppressing output voltage error between AC voltage and the voltage command Vph* for each phase, generated due to the dead time Td being set. That is, in the actual dead time Td, the actual effective value thereof is different from a predetermined dead time Td, due to the characteristics of the semiconductor elements composing the power converter 20, the circuit configuration, and the like. The compensation value Vcmp is for suppressing dead time error which is error between the set dead time Td and the actual dead time Td, to reduce output voltage error.

As described above, the actual dead time Td changes in accordance with the circuit configuration of the power converter 20 and the like. For example, in a case where the power converter 20 performs 3-level operation, in the bidirectional switch SWA connected to the voltage-division point 2m, current is applied to two semiconductor elements which are the switching element SW3 and the diode. Thus, in the case where the power converter 20 performs 3-level operation, the number of elements to which current is applied increases as compared to a case of 2-level operation. Accordingly, the dead time Td has a period that differs depending on whether the power converter 20 performs 2-level operation or 3-level operation, and therefore the compensation value Vcmp for compensating the dead time error also needs to be set at a value appropriate for each of 2-level operation and 3-level operation.

In the storage unit 55A1, compensation values Vcmp2 (Vcmp2_U, Vcmp2_V, Vcmp2_W) for respective phases according to the configuration of the power converter 20 in a case where the operation mode of the power converter 20 is 2-level operation, are stored.

In the storage unit 55A2, compensation values Vcmp3 (Vcmp3_U, Vcmp3_V, Vcmp3_W) for respective phases according to the configuration of the power converter 20 in a case where the operation mode of the power converter 20 is 3-level operation, are stored.

Further, as the compensation values Vcmp2, a plurality of values (Td1, Td2, Td3) are determined in advance in association with the element indicating the operation state of the power converter 20 such as the phase current iph and the carrier frequency Fc when the operation mode is the 2-level operation mode, and are stored in a form of table data.

In addition, as the compensation values Vcmp3, a plurality of values (Td1, Td2, Td3) are determined in advance in association with the element indicating the operation state of the power converter 20 such as the phase current iph and the carrier frequency Fc when the operation mode is the 3-level operation mode, and are stored in a form of table data.

The compensation values Vcmp2 and the compensation values Vcmp3 are the absolute values of compensation values.

The compensation value switchover unit 55A determines an optimum compensation value Vcmp2 (Td1, Td2, Td3) in a case of 2-level operation and an optimum compensation value Vcmp3 (Td1, Td2, Td3) in a case of 3-level operation, in accordance with the inputted phase current iph and carrier frequency Fc, on the basis of the table data in the storage units 55A1, 55A2.

As the absolute values of the compensation values Vcmp2 and the compensation values Vcmp3, values stored in a form of table data in advance as described above may be used, or the values may be dynamically derived using the following expressions on the basis of the inputted phase current iph, carrier frequency Fc, and dead time Td.

Case of 2-Level Operation:

$$Vcmp2 = 2 \times Td \times Fc$$

Case of 3-Level Operation:

$$Vcmp3 = Td \times Fc$$

Here, Td [s] is a dead time and Fc [Hz] is a carrier frequency.

In a case where the operation mode specified by the level specification signal LvS outputted from the level switchover determination unit 54 is 2-level operation, the compensation value switchover unit 55A outputs the compensation value Vcmp2 corresponding to the case of 2-level operation as the compensation value Vcmp through switchover by the selector 55A3. In a case where the operation mode specified by the level specification signal LvS is 3-level operation, the compensation value switchover unit 55A outputs, to the correction circuit 55B, the compensation value Vcmp3 corresponding to the case of 3-level operation as the compensation value Vcmp through switchover by the selector 55A3.

Here, the compensation value switchover unit 55A determines the compensation value Vcmp (Vcmp_U, Vcmp_V, Vcmp_W) to be outputted, using the compensation value Vcmp2 or Vcmp3, on the basis of the following expressions, and outputs the compensation value Vcmp.

Case of 2-Level Operation:

$$Vcmp = \mathrm{sign}(iph) \times Vcmp2$$

Case of 3-Level Operation:

$$Vcmp = \mathrm{sign}(iph) \times Vcmp3$$

Here, iph (iu, iv, iw) is applied current for each phase.

In addition, sign(iph) represents the polarity of each phase current, and is +1 in a case where iph is equal to or greater than zero, and −1 in a case where iph is smaller than zero.

As shown in FIG. 2, the compensation value Vcmp outputted from the compensation value switchover unit 55A is inputted to the correction circuit 55B.

As shown in the following expression, the correction circuit 55B performs correction by adding the compensation value Vcmp inputted from the compensation value switchover unit 55A, to the voltage command Vph* (Vu*, Vv*, Vw*) for each phase inputted from the voltage command calculation unit 51.

$$Vph^* \text{ (output)} = Vph^* \text{ (input)} + Vcmp$$

Thus, addition or subtraction of the dead time compensation value Vcmp to or from the voltage command Vph* is determined in accordance with the polarity (sign(iph)) of the phase current iph.

Then, the voltage command correction unit 55 outputs each phase voltage command Vph* (Vu*, Vv*, Vw*) for which voltage error has been compensated by the compensation value Vcmp, to the PWM control unit 50B at the subsequent stage.

As described above, the voltage command correction unit 55 compensates the voltage command Vph*, using the compensation value Vcmp according to the operation state in a case of 2-level operation or the compensation value Vcmp according to the operation state in a case of 3-level operation, on the basis of the detected phase current iph, carrier frequency Fc, dead time Td, and level specification signal LvS.

In the above description, the case where the compensation values Vcmp2, Vcmp3 are determined in association with the phase current iph and the carrier frequency Fc, has been shown, but the present disclosure is not limited thereto.

Next, the PWM control unit 50B will be described.

Figure 5:
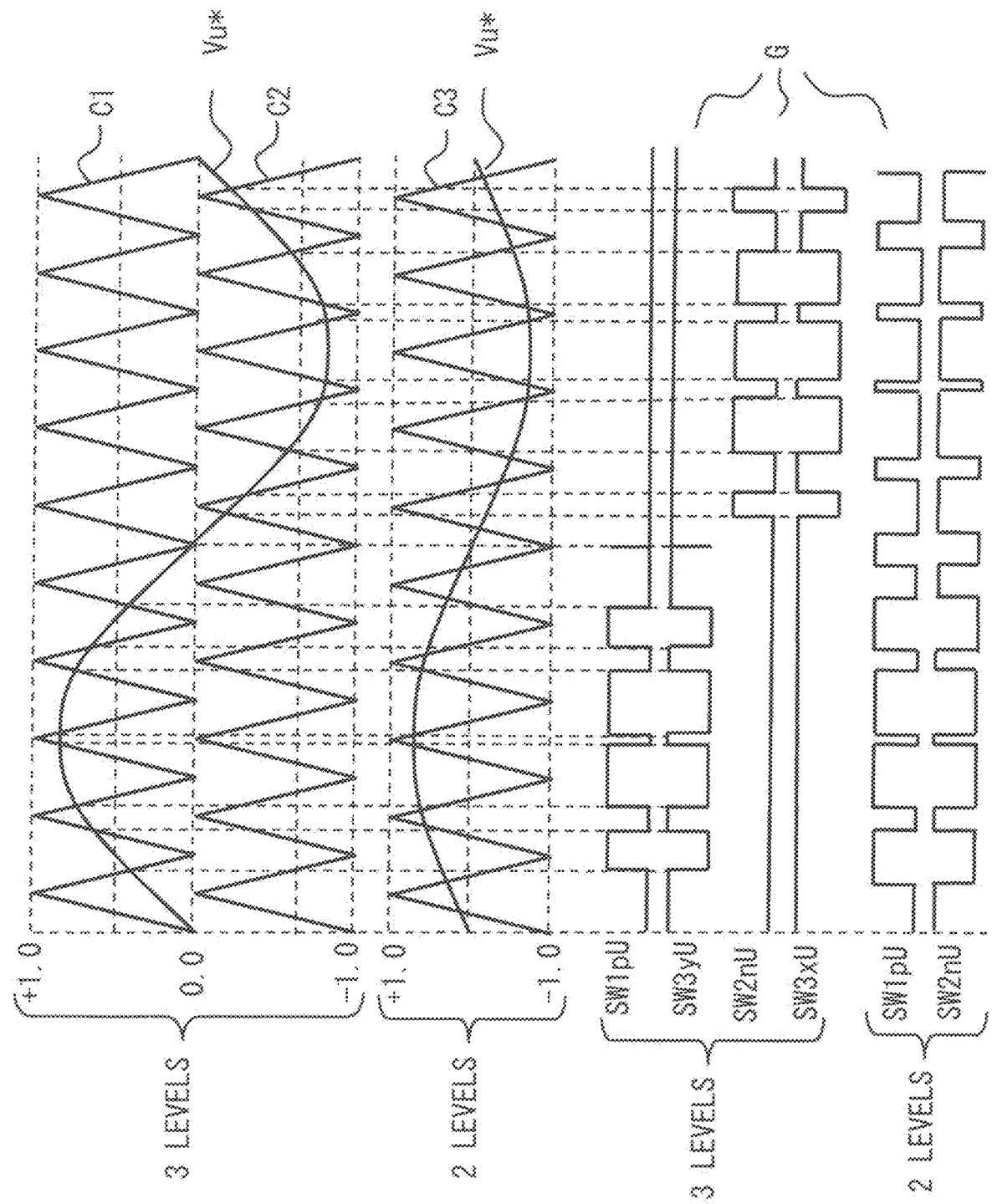
FIG. 5 shows a generation method for switching signals in 3-level operation and 2-level operation in PWM control by a PWM control unit according to embodiment 1.

FIG. 5 shows a generation method for the switching signals G in 3-level operation and 2-level operation in PWM control by the PWM control unit 50B according to embodiment 1.

The PWM control unit SOB performs amplitude comparison between the voltage command Vu* and triangular carrier waves C, to generate the switching signals G for controlling the switching elements SW.

In FIG. 5, an example of PWM control for U phase is shown as a representative, but the same applies to V phase and W phase.

As shown in FIG. 2, the PWM control unit 50B receives the compensated U-phase voltage command Vu* inputted from the voltage command generation unit 50A, the carrier frequency Fc determined by the carrier frequency (Fc) determination unit 52, the dead time Td determined by the dead time setting unit 53, and the level specification signal LvS determined by the level switchover determination unit 54.

A case where the operation mode of the power converter 20 is 3-level operation will be described.

In this case, as shown in FIG. 5, the PWM control unit 50B performs amplitude comparison between the U-phase voltage command Vu* and two carrier waves C1, C2.

The carrier wave C1 is a signal having an amplitude of +1.0 to 0.0, and the carrier wave C2 is a signal having an amplitude of 0.0 to −1.0. The carrier wave C1 and the carrier wave C2 are the same in phase and different only in amplitude. The U-phase voltage command Vu* is a signal having an amplitude of −1.0 to +1.0. These signals are all processed as normalized values.

The PWM control unit 50B compares the U-phase voltage command Vu* and the carrier wave C1, to generate the switching signals G for turning on/off the switching element SW1pU connected to the positive side of the DC circuit unit 10 and the switching element SW3yU forming the bidirectional switch SWA connected to the voltage-division point 2m of the DC circuit unit 10. Thus, at the AC terminal AcU of the power converter 20, voltage Vdc at the positive side of the DC circuit unit 10 or voltage Vdc/2 at the voltage-division point 2m is outputted.

Meanwhile, the PWM control unit 50B compares the U-phase voltage command Vu* and the carrier wave C2, to generate the switching signals G for turning on/off the switching element SW2nU connected to the negative side of the DC circuit unit 10 and the switching element SW3xU forming the bidirectional switch SWA connected to the voltage-division point 2m of the DC circuit unit 10. Thus, at the AC terminal AcU of the power converter 20, voltage of 0 at the negative side of the DC circuit unit 10 or voltage Vdc/2 at the voltage-division point 2m is outputted.

Through control in the PWM control unit 50B as described above, the control device 50 performs 3-level operation of controlling the AC rotary machine 30 by outputting AC voltage composed of 3-level voltages having different potentials at the positive side, the negative side, and the voltage-division point 2m of the DC circuit unit 10.

Next, a case where the operation mode of the power converter 20 is 2-level operation will be described.

In this case, as shown in FIG. 5, the PWM control unit SOB performs amplitude comparison between the U-phase voltage command Vu* and one carrier wave C3.

The carrier wave C3 is a signal having an amplitude of +1.0 to −1.0, and has the same phase as the carrier wave C1 and the carrier wave C2, while only the amplitude is different.

The PWM control unit 50B compares the U-phase voltage command Vu* and the carrier wave C3, to generate the switching signals G for turning on/off the switching element SW1pU connected to the positive side of the DC circuit unit 10 and the switching element SW2nU connected to the negative side of the DC circuit unit 10. Thus, at the AC terminal AcU of the power converter 20, voltage Vdc at the positive side of the DC circuit unit 10 or voltage of 0 at the negative side thereof is outputted.

Through such control, the control device 50 performs 2-level operation of controlling the AC rotary machine 30 by outputting AC voltage composed of 2-level voltages having different potentials at the positive and negative sides of the DC circuit unit 10.

The frequencies of the triangular carrier wave C (C1, C2, C3) shown in FIG. 5 are determined by the carrier frequency Fc inputted to the PWM control unit 50B.

Hereinafter, a circuit configuration of the PWM control unit 50B for executing the PWM control as described above will be described.

Figure 6:
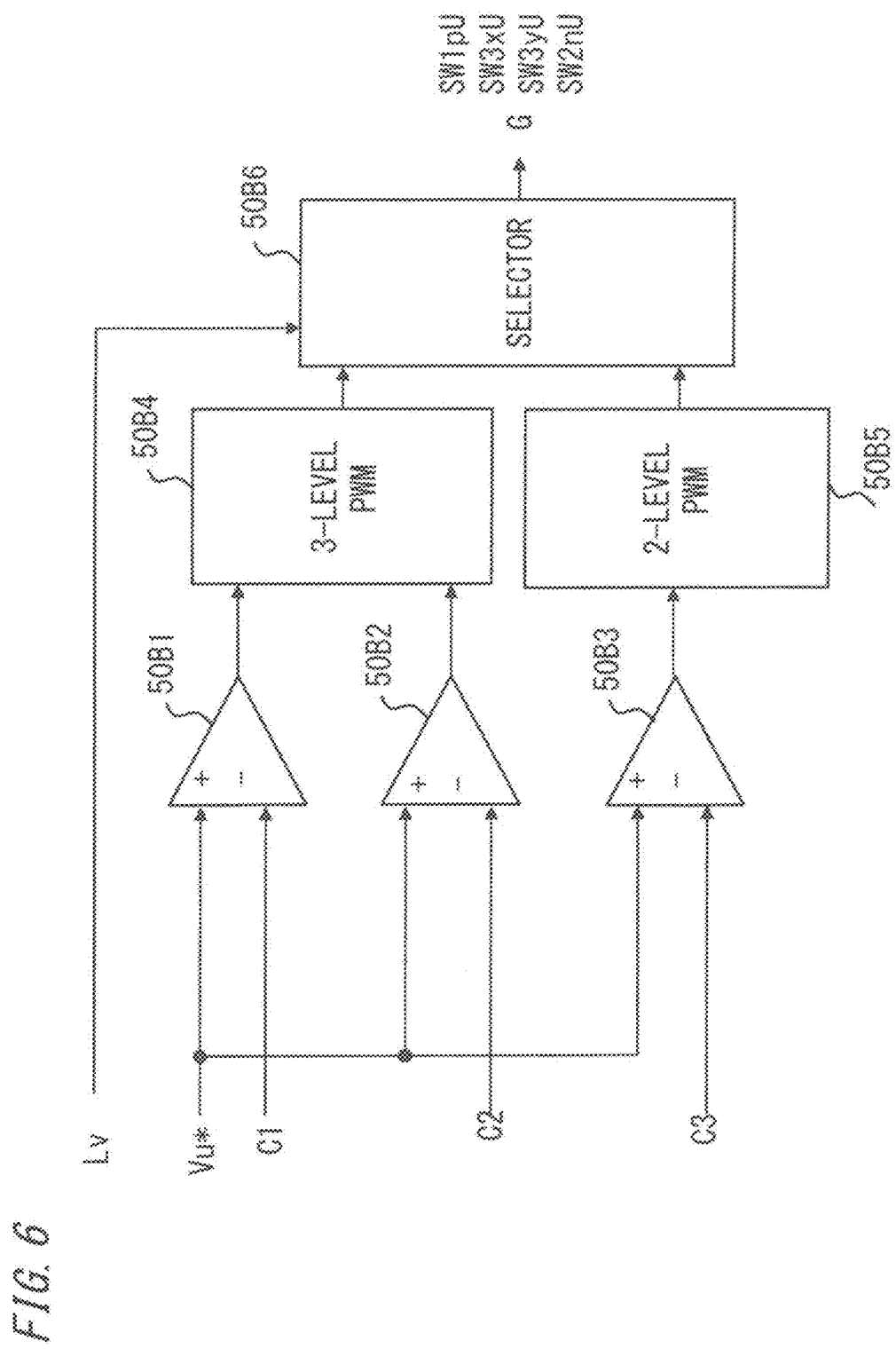
FIG. 6 is a function block diagram of the PWM control unit according to embodiment 1.

FIG. 6 is a function block diagram of the PWM control unit 50B according to embodiment 1, and shows PWM control performed through comparison between the voltage command Vph* and the carrier waves C, and a switchover method between 2-level operation and 3-level operation. Description will be given using the U-phase voltage command Vu*, as an example.

The inputted U-phase voltage command Vu* is compared with the carrier wave C1 in a comparator 50B1, and compared with the carrier wave C2 in a comparator 50B2.

Then, the switching signals G for 3-level operation for driving the switching elements SW1pU, SW3yU, SW3xU, SW2nU are generated and inputted to a 3-level PWM unit 50B4.

The 3-level PWM unit 50B4 performs processing such as adding the dead time Td to the inputted switching signals G, and outputs the resultant signals to a selector 50B6.

In addition, the inputted U-phase voltage command Vu* is compared with the carrier wave C3 in a comparator 50B3. Then, the switching signals G for 2-level operation for driving the switching elements SW1pU, SW2nU are generated and inputted to a 2-level PWM unit SOBS.

The 2-level PWM unit 50B5 generates the switching signals G for constantly turning off the switching elements SW3xU, SW3yU connected to the voltage-division point 2m having the potential Vdc/2, performs processing such as adding the dead time Td to the inputted switching signals G for driving the switching elements SW1pU, SW2nU, and outputs the resultant signals to the selector 50B6.

As described above, outputs of the 3-level PWM unit 50B4 and the 2-level PWM unit 5085 are inputted to the selector 50B6. In addition, the level specification signal LvS is inputted to the selector 50B6. As described above, the level specification signal LvS specifies whether to set 2-level operation or 3-level operation as the operation mode of the power converter. The selector 50B6 selects either the switching signals G inputted from the 2-level PWM unit 50B5 or the switching signals G inputted from the 3-level PWM unit 50B4, in accordance with the level specification signal LvS, and outputs the selected signals as the switching signals G.

Here, the description has been given for U phase, as an example. In a case of V phase, the same processing as described above is performed for the switching elements SW1pV, SW2nV, SW3xV, SW3yV, and in a case of W phase, the same processing as described above is performed for the switching elements SW1pW, SW2nW, SW3xW, SW3yW.

As described above, the switching signals G for controlling the switching elements for respective phases are generated from the respective phase voltage commands Vph* for three-phase AC, to perform PWM control.

Next, switchover of the operation mode and the compensation value Vcmp based on the level specification signal LvS will be described.

Figure 7:
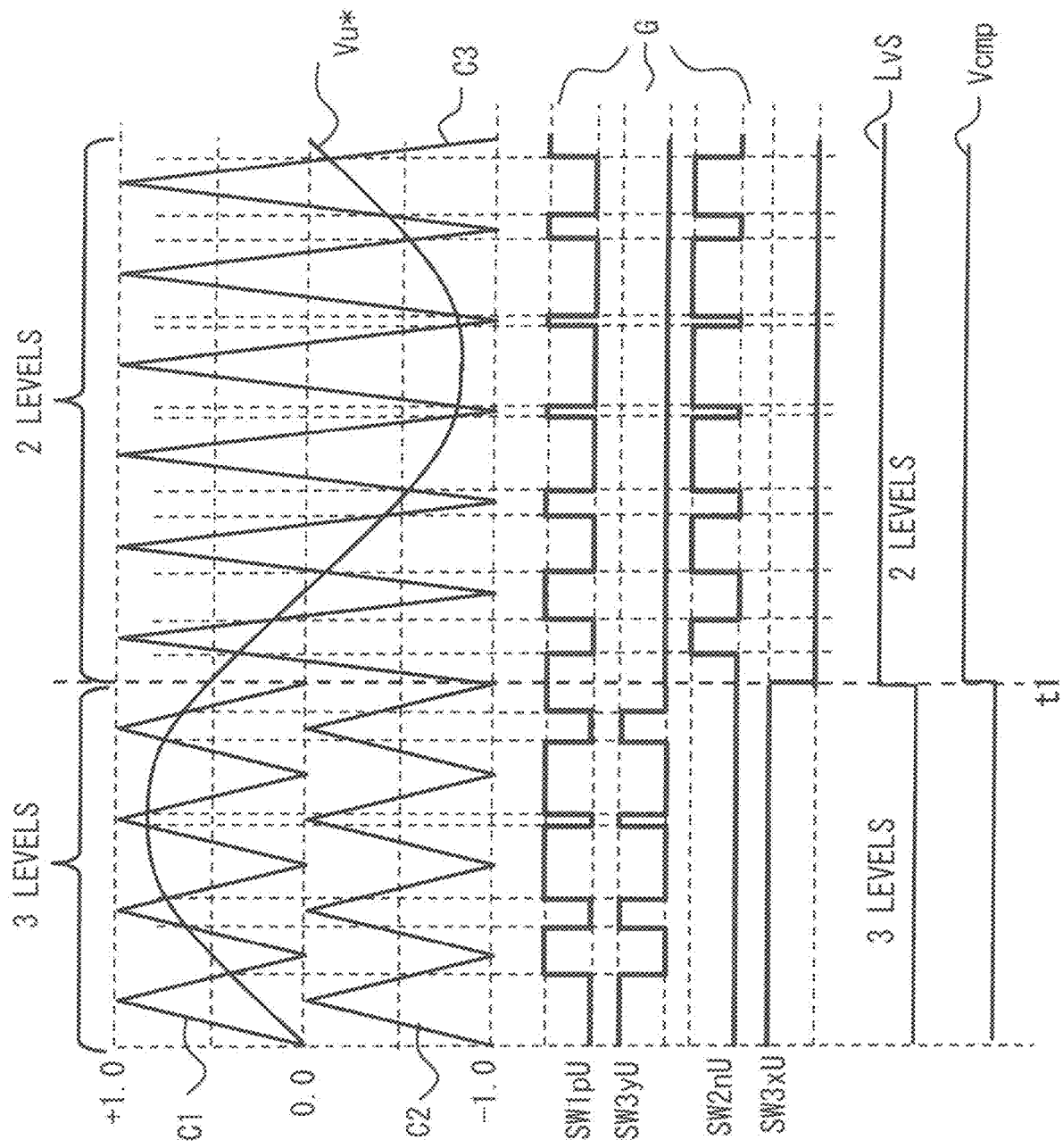
FIG. 7 shows switchover between 3-level operation and 2-level operation in the PWM control unit according to embodiment 1.

FIG. 7 shows the relationship among the carrier wave C for U phase, the voltage command Vu*, the switching signals G, the level specification signal LvS, and the compensation value Vcmp, in switchover control for switching the operation mode of the power converter 20 from 3-level operation to 2-level operation in the PWM control unit 50B according to embodiment 1.

As described above, the voltage command generation unit 50A corrects the voltage command Vph*, using the compensation value Vcmp according to the operation state in a case of 2-level operation or the compensation value Vcmp according to the operation state in a case of 3-level operation, on the basis of the level specification signal LvS. That is, as shown in FIG. 7, the voltage command generation unit 50A performs switchover control for switching between 2-level operation and 3-level operation, on the basis of the level specification signal LvS, and at the same time, switches the compensation value Vcmp from the value in a case of 3-level operation to the value in a case of 2-level operation, in the above switchover control. The same applies to a case of switching the compensation value Vcmp from the value in a case of 2-level operation to the value in a case of 3-level operation.

As described above, update of the level specification signal LvS for specifying the operation mode of the power converter 20 is performed in synchronization with a set timing in the carrier wave C. That is, in the present embodiment, the set timing is a timing of a top or a bottom in the carrier wave C, and in FIG. 7, is time t1 which is a timing at which the carrier waves C1, C2, C3 have bottoms.

More specifically, in a phase range where the voltage command Vph* is positive, the voltage command generation unit 50A performs switchover control at a timing of a bottom of the carrier signal C as a set timing in the carrier signal C. Meanwhile, in a phase range where the voltage command Vph* is negative, the voltage command generation unit 50A performs switchover control at a timing of a top of the carrier signal C as a set timing in the carrier signal C.

By performing update of the level specification signal LvS at such a timing as described above, the operation mode can be switched at a timing when the switching element SW1 connected to the positive side or the switching element SW2 connected to the negative side of the DC circuit unit 10 is ON and current is not flowing through the switching elements SW3x, SW3y forming the bidirectional switch SWA connected to the voltage-division point 2m. As described above, in switchover from 3-level operation to 2-level operation, current is not flowing through the switching elements SW3x, SW3y at the timing of turning off the switching elements SW3x, SW3y. Thus, it is possible to stably switch the operation mode while suppressing disturbance of current and variation in torque due to the switching elements being turned off.

Hereinafter, effects obtained by switching the compensation value Vcmp at the same time as switchover of the operation mode as described above will be described using a comparative example.

Figure 8:
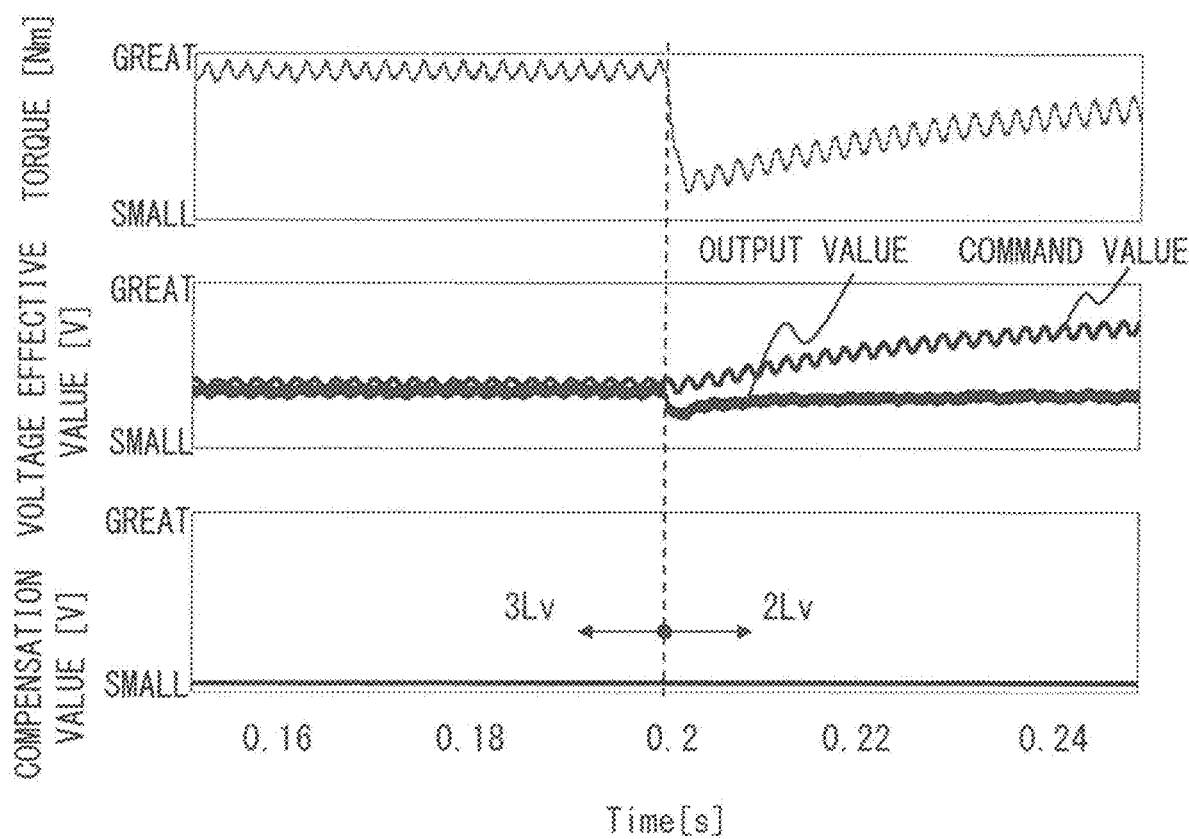
FIG. 8 shows torque, the effective value of an output value of a power converter, a command value for phase voltage, and a voltage compensation value in a power conversion device in a comparative example.

FIG. 8 shows torque, the effective value of an output value of a power converter, a command value for phase voltage, and a compensation value in a power conversion device in a comparative example.

Figure 9:
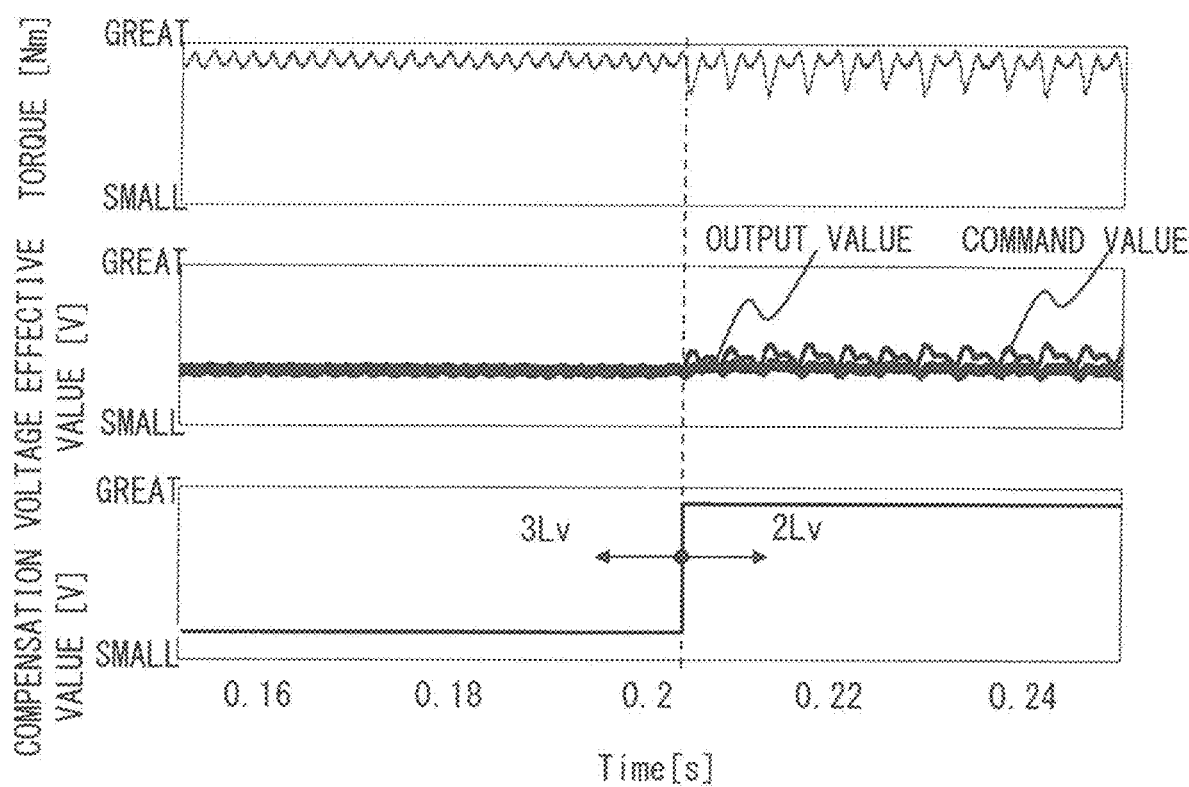
FIG. 9 shows torque, the effective value of an output value of a power converter, a command value for phase voltage, and a voltage compensation value in the power conversion device according to embodiment 1.

FIG. 9 shows torque, the effective value of an output value of the power converter, a command value for phase voltage, and the compensation value in the power conversion device 100 of the present embodiment.

In the AC rotary machine driving system in the comparative example shown in FIG. 8, the compensation value for voltage error is not changed at the same time as switchover of the operation mode. In this case, upon switchover of the operation mode, sharp deviation occurs between the voltage command value and the output value, so that output torque of the AC electric motor greatly varies.

On the other hand, in the power conversion device 100 of the present embodiment, the compensation value Vcmp is switched at the same time as switchover of the operation mode. Thus, it is possible to suppress error between the voltage command value and the output value before and after switchover of the operation mode. In this way, torque variation between before and after switchover of the operation mode can be reduced to almost zero.

Next, a power conversion device 100e having a configuration different from the power conversion device 100 shown in FIG. 1 will be described.

Figure 10:
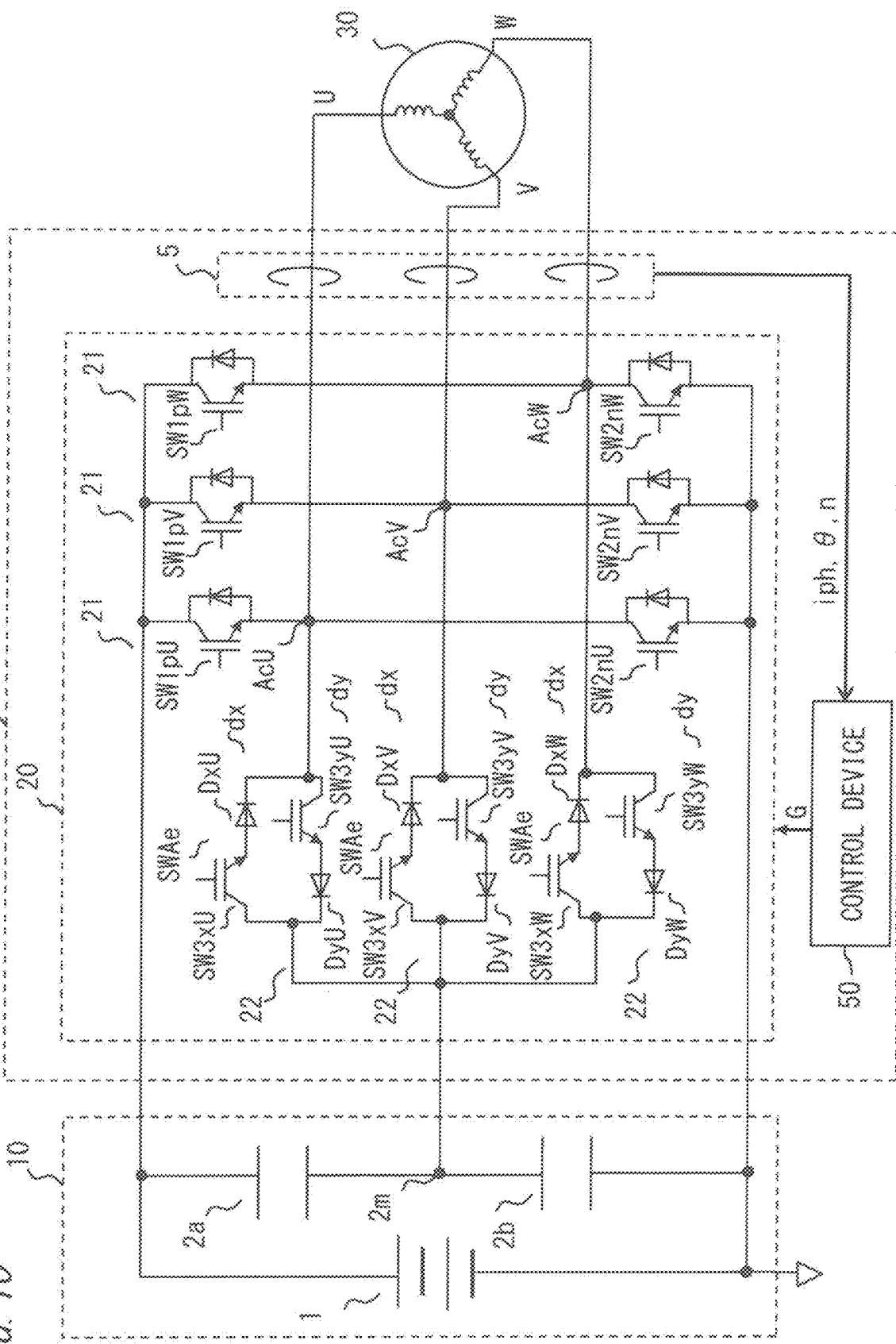
FIG. 10 is a block diagram showing a schematic configuration of a power conversion device according to embodiment 1.

FIG. 10 is a block diagram showing a schematic configuration of the power conversion device 100e according to embodiment 1.

The power conversion device 100e shown in FIG. 10 is different in a configuration of a bidirectional switch SWAe connected to the voltage-division point 2m between the capacitors 2a, 2b, as compared to the power conversion device 100 shown in FIG. 1.

In the power conversion device 100e, diodes Dx (DxU, DxV, DxW) as semiconductor elements are respectively connected in series to the switching elements SW3x (SW3xU, SW3xV, SW3xW) as third semiconductor elements, thus forming series units dx.

In addition, diodes Dy (DyU, DyV, DyW) as semiconductor elements are respectively connected in series to the switching elements SW3y (SW3yU, SW3yV, SW3yW) as third semiconductor elements, thus forming series units dy.

Then, in each phase, the two series units dx and dy are connected in anti-parallel to each other, thus forming the bidirectional switch SWAe.

Also in the power conversion device 100e having the above configuration, the compensation value Vcmp is switched between a case of 2-level operation and a case of 3-level operation, whereby it is possible to suppress variation in current and variation in torque while reducing loss.

In addition, also in the power conversion device 100e having the above configuration, the operation mode is switched at such a timing as described in the power conversion device 100, whereby it is possible to switch the operation mode at a timing when current is not flowing through the switching elements SW3x, SW3y forming the bidirectional switch SWA.

In the above description, as a power converter capable of switching between 2-level operation and 3-level operation, the power converter having the bidirectional switches has been shown. However, the configuration of the power converter is not limited as long as it is possible to switch between 2-level operation and 3-level operation.

In addition, the case where the power converter has a configuration capable of outputting three-phase AC has been shown, but the power converter may have a single-phase configuration.

The control unit for the power converter according to the present embodiment configured as described above is a control unit for a power converter which has a plurality of semiconductor elements for controlling conduction and interruption on a power supply path, between a DC circuit unit and an AC circuit unit, and converts DC power from the DC circuit unit to AC power for the AC circuit unit.

The control unit has
 a 3-level operation mode of outputting AC voltage composed of 3-level voltages at a positive side and a negative side of the DC circuit unit and a voltage-division point of DC voltage between the positive side and the negative side of the DC circuit unit by performing ON/OFF control of the semiconductor elements on the basis of an output voltage command, and
 a 2-level operation mode of outputting AC voltage composed of 2-level voltages at the positive side and the negative side of the DC circuit unit by performing ON/OFF control of the semiconductor elements on the basis of the output voltage command.

The control unit performs switchover control for switching between the 2-level operation mode and the 3-level operation mode, and in the switchover control, switches a compensation value for compensating error between the voltage command and AC voltage, between a case of the 2-level operation mode and a case of the 3-level operation mode.

As described above, the control unit performs the switchover control for switching between the 3-level operation mode of outputting AC voltage composed of 3-level voltages at the positive side, the negative side, and the voltage-division point of the DC circuit unit, and the 2-level operation mode of outputting AC voltage composed of 2-level voltages at the positive side and the negative side of the DC circuit unit, on the basis of the level specification signal.

In this way, the operation mode of the power converter can be switched to an optimum operation mode on the basis of the level specification signal determined in accordance with the operation state, for example.

For example, in a case of making output AC voltage close to a sinewave to reduce harmonic current and ripple current and reducing voltages applied to the switching elements to reduce switching loss, the 3-level operation mode is performed. Meanwhile, for example, in a case of reducing conduction loss of the semiconductor elements, the 2-level operation is performed. Thus, by having switchover control for switching between 2-level operation and 3-level operation, it is possible to perform high-efficiency power conversion utilizing the respective advantages of 2-level operation and 3-level operation.

Then, in the switchover control, the control unit switches the compensation value for compensating error between the voltage command and the AC voltage, between a case of the 2-level operation mode and a case of the 3-level operation mode.

Here, error between the voltage command and the AC voltage can change in accordance with the circuit configuration of the power converter and the like. For example, the number of semiconductor elements such as switching elements and diodes to which current is applied, a wiring path length, and the like are different between a case where the power converter 20 performs 3-level operation and a case where the power converter 20 performs 2-level operation. Therefore, by switching the compensation value for compensating error between the voltage command and the AC voltage to a value according to the configuration of each operation mode of the power converter, it becomes possible to suppress error variation between the voltage command value and the output voltage of the power converter before and after level switchover. Thus, it becomes possible to suppress variation in each phase current and variation in output torque upon switchover of the operation mode while suppressing loss in driving of the power converter and the AC rotary machine by selecting an optimum operation mode. In this way, operation of the power converter can be stabilized.

In the control unit for the power converter according to the present embodiment configured as described above,
a dead time compensation value for compensating dead time error in the power converter is set as the compensation value.

As described above, the dead time compensation value for compensating dead time error is set as the compensation value. Thus, in accordance with the characteristics of the semiconductor elements composing the power converter, the circuit configuration, and the like, the compensation value for dead time error which needs to be adjusted is switched between a case of 2-level operation and a case of 3-level operation, whereby error variation between the output voltage and the voltage command value can be further suppressed, and a loss suppression effect, a current variation suppression effect, and a torque variation suppression effect are obtained.

In the control unit for the power converter according to the present embodiment configured as described above,
the switchover control is performed only in a phase range where current values for all phases in the AC circuit unit are outside a first threshold range centered at 0.

As described above, with the configuration in which the switchover control is performed only in a phase range where currents for all phases in the AC circuit unit are outside the first threshold range centered at 0, it is possible to avoid level switchover under a condition in which accuracy of the compensation value is low when current is close to zero. Thus, it is possible to further suppress variation in each phase current and variation in output torque before and after level switchover.

In the control unit for the power converter according to the present embodiment configured as described above,
the dead time compensation value is determined in accordance with at least one of a frequency of a carrier signal in PWM for performing ON/OFF control of the semiconductor elements or phase current in the AC circuit unit.

As described above, the dead time compensation value is determined in accordance with at least one of the frequency of the carrier signal or the phase current in the AC circuit unit. Thus, by determining the dead time compensation value on the basis of the frequency of the carrier signal and the phase current in the AC circuit unit which indicate the operation state of the power converter, an accurate compensation value according to the operation mode of the power converter is obtained.

In addition, for example, while switchover control is performed only in a phase range where currents for all phases in the AC circuit unit are greater than 0 so that level switchover is avoided when current is close to zero, in a case of dynamically deriving the dead time compensation value in accordance with the phase current, the dead time compensation value whose change is great when current is close to zero can be determined more accurately.

In the control unit for the power converter according to the present embodiment configured as described above,
in the switchover control, addition or subtraction of the dead time compensation value to or from the voltage command is determined in accordance with a polarity of phase current in the AC circuit unit, and the voltage command is corrected by the addition or subtraction of the dead time compensation value.

As described above, whether to add or subtract the compensation value is determined in accordance with the polarity of the phase current, whereby voltage error occurring due to the dead time can be appropriately compensated. Thus, it becomes possible to suppress variation in each phase current and also suppress variation in output torque.

The power conversion device according to the present embodiment configured as described above includes:
the control unit for the power converter configured as described above; and
the power converter.

The power converter includes
a first arm for at least one phase of the AC circuit unit, the first arm being connected in parallel between the positive side and the negative side of the DC circuit unit and being formed by connecting a first semiconductor switch and a second semiconductor switch as the semiconductor elements in series, and
a second arm which has a bidirectional switch formed by the semiconductor element and is connected between an AC terminal and the voltage-division point of the DC circuit unit, the AC terminal being a connection point of the first semiconductor switch and the second semiconductor switch.

The bidirectional switch has diodes and third semiconductor switches as the semiconductor elements, and is configured such that the third semiconductor switches to which the diodes are connected in anti-parallel are connected in anti-series or series units each formed by connecting the diode and the third semiconductor switch in series are connected in anti-parallel.

The control unit performs ON/OFF control of the semiconductor elements by performing PWM on the basis of the voltage command and a carrier signal, and performs the switchover control in synchronization with a set timing in the carrier signal.

As described above, the power converter is configured such that the second arm having the bidirectional switch formed by the semiconductor element is connected between the voltage-division point of the DC circuit unit and the AC terminal which is a connection point of the first semiconductor switch and the second semiconductor switch. Here, the bidirectional switch is configured such that the third semiconductor switches to which the diodes are connected in anti-parallel are connected in anti-series or the series units each formed by connecting the diode and the third semiconductor switch in series are connected in anti-parallel.

For the power converter having the above configuration, the control unit performs the switchover control in synchronization with a set timing in the carrier signal.

Thus, for example, in a case of switching the operation mode from 3-level operation to 2-level operation, a timing when current is not flowing through the third semiconductor switch forming the bidirectional switch is specified as the set timing, whereby it is possible to stably switch the operation mode while suppressing disturbance of current and variation in torque which occur upon switchover.

In the power conversion device according to the present embodiment configured as described above, in a phase range where the voltage command is positive, the control unit performs the switchover control at a timing of a bottom of the carrier signal as the set timing in the carrier signal, and in a phase range where the voltage command is negative, the control unit performs the switchover control at a timing of a top of the carrier signal as the set timing in the carrier signal.

As described above, as the set timing for performing switchover control, a timing of a bottom of the carrier signal is used in a phase range where the voltage command is positive, and a timing of a top of the carrier signal is used in a phase range where the voltage command is negative. Thus, for example, in a case of switching from 3-level operation to 2-level operation, switchover control is performed at the above-described timing, whereby it is possible to perform switchover in a state in which current is not flowing through the switching element SW3 forming the bidirectional switch. Thus, it is possible to stably switch the operation mode while suppressing disturbance of current and variation in torque which occur upon switchover.

Embodiment 2

Hereinafter, embodiment 2 of the present disclosure will be described focusing on difference from the above embodiment 1, with reference to the drawings. The same parts as in the above embodiment 1 are denoted by the same reference characters and the description thereof is omitted.

Figure 11:
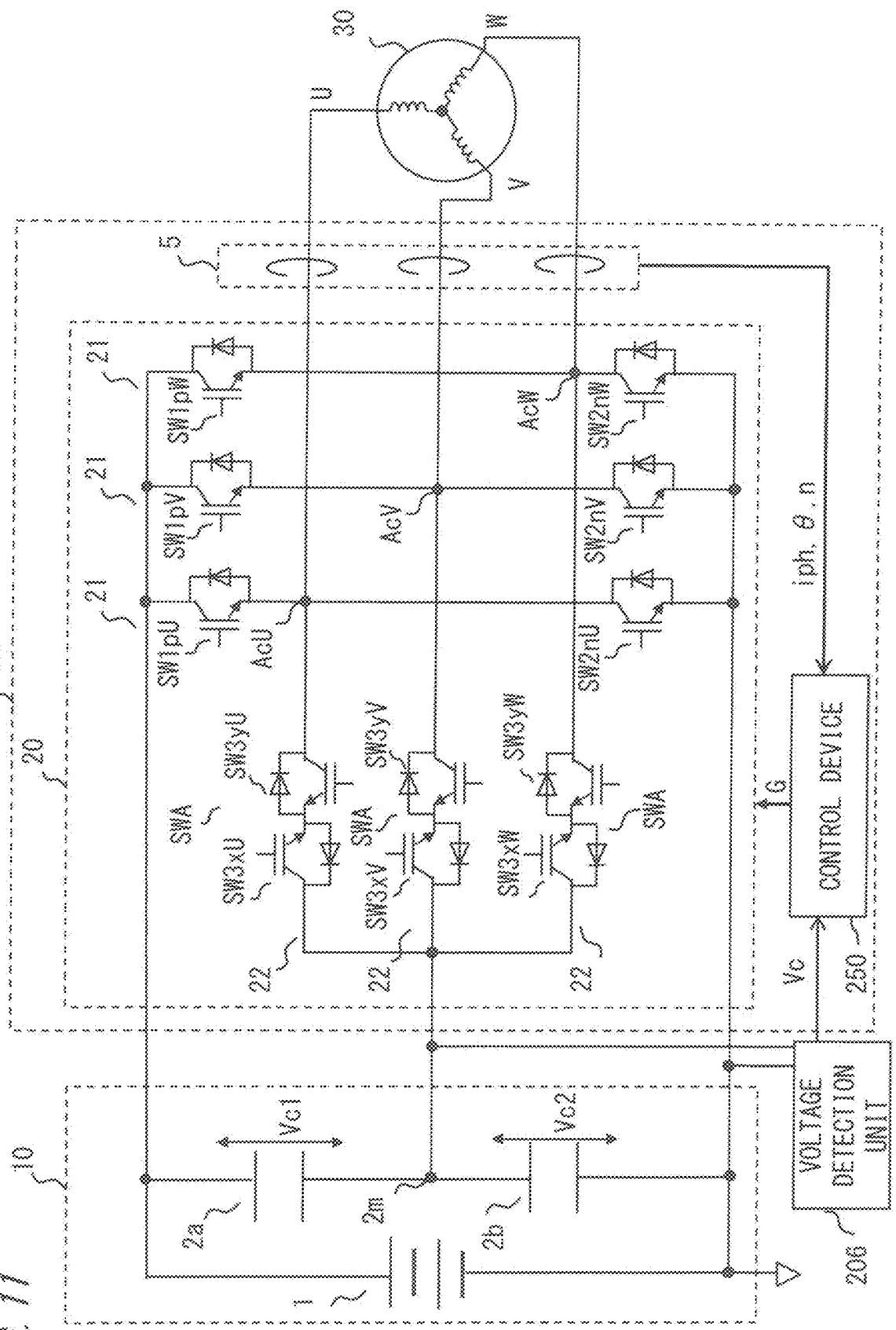
FIG. 11 is a block diagram showing a schematic configuration of a power conversion device according to embodiment 2.

FIG. 11 is a block diagram showing a schematic configuration of a power conversion device 200 according to embodiment 2.

Figure 12:
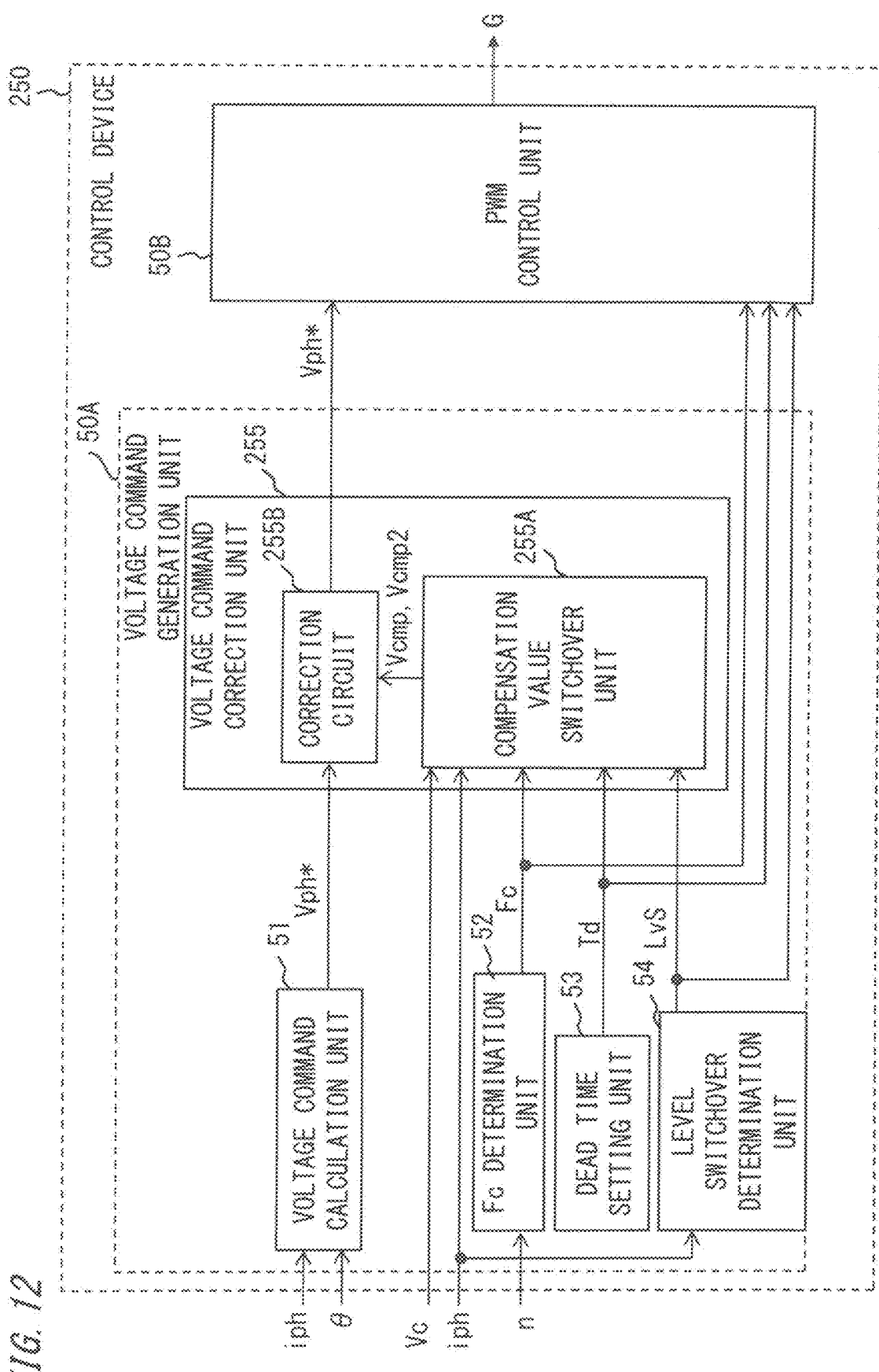
FIG. 12 is a function block diagram of a control device showing a compensation method for a voltage command according to embodiment 2.

FIG. 12 is a function block diagram of a control device 250 according to embodiment 2, and shows a compensation method for a voltage command Vph* which is a major part of the present embodiment, and a generation method for switching signals G.

The power conversion device 200 according to embodiment 2 is provided with a voltage detection unit 206 for detecting voltage (hereinafter, referred to as an intermediate potential Vc) at the voltage-division point 2m which is a connection point of the capacitors 2a, 2b, unlike the power conversion device 100 described in the above embodiment 1.

Further, as shown in FIG. 12, a voltage command correction unit 255 according to the present embodiment 2 is configured to receive the detected intermediate potential Vc and compensate each phase voltage command Vph*, considering variation in the intermediate potential Vc.

As shown in FIG. 11, the voltage detection unit 206 detects the intermediate potential Vc at the voltage-division point 2m between the capacitors 2a, 2b of the DC circuit unit 10, and inputs the detected intermediate potential Vc to the control device 250.

As described in embodiment 1, the capacitors 2a, 2b divide the DC voltage Vdc between the positive side and the negative side of the DC voltage source 1, and each have a potential of Vdc/2. However, in 3-level operation, in accordance with power supply amounts for the three phases, a deviation occurs between the voltage Vc1 of the capacitor 2a and the voltage Vc2 of the capacitor 2b, so that the intermediate potential Vc varies.

Accordingly, a compensation value switchover unit 255A uses a balance compensation value Vcmp2 as a compensation value for compensating potential variation at the voltage-division point 2m of the DC circuit unit 10 so that the voltage Vc1 of the capacitor 2a which is a first potential difference between the voltage-division point 2m and the positive side of the DC circuit unit 10 and the voltage Vc2 of the capacitor 2b which is a second potential difference between the voltage-division point 2m and the negative side of the DC circuit unit 10 become equal to each other.

The balance compensation value Vcmp2 is set to be invalid in a case of the 2-level operation mode, and is set to be valid in a case of the 3-level operation mode. Thus, the compensation value switchover unit 255A does not output the balance compensation value Vcmp2 as the compensation value Vcmp in a case of switching the operation mode to the 2-level operation mode, and outputs the balance compensation value Vcmp2 to a correction circuit 255B in a case of switching the operation mode to the 3-level operation mode, on the basis of the inputted level specification signal LvS.

In a case where the operation mode of the power converter 20 is 3-level operation, the correction circuit 255B compensates the phase voltage commands Vph* (Vu*, Vv*, Vw*) from the voltage command calculation unit 51 by the balance compensation value Vcmp2 inputted from the compensation value switchover unit 255A, as shown by the following expressions.

$$Dir = \mathrm{sign}(Vu^* \times iu) \times |Vu^*| + \mathrm{sign}(Vv^* \times iv) \times |Vv^*| + \mathrm{sign}(Vw^* \times iw) \times |Vw^*|$$

Here, Dir is a variable indicating the polarity of the three-phase power supply direction.

Case of $(Vdc/2 - Vc) \times Dir < 0$, $$Vu1^* = Vu^* - Vcmp2$$
$$Vv1^* = Vv^* - Vcmp2$$
$$Vw1^* = Vw^* - Vcmp2$$

Case of $(Vdc/2 - Vc) \times Dir \geq 0$, $$Vu1^* = Vu^* + Vcmp2$$
$$Vv1^* = Vv^* + Vcmp2$$
$$Vw1^* = Vw^* + Vcmp2$$

Here, Vu1*, Vv1*, and Vw1* are the compensated phase voltage commands Vph*.

As described above, the voltage command correction unit 255 determines addition or subtraction of the balance compensation value Vcmp2 to or from the voltage commands Vph* (Vu*, Vv*, Vw*) for respective phases, in accordance with a case of (Vdc/2−Vc)×Dir<0 and a case of (Vdc/2−Vc)×Dir≥0, i.e., the polarity of voltage variation at the voltage-division point 2m based on a deviation between the voltage Vc1 of the capacitor 2a and the voltage Vc2 of the capacitor 2b, and the polarity of the power supply direction for the AC circuit unit.

Then, by the determined addition or subtraction of the balance compensation value Vcmp2, the voltage commands Vph* (Vu*, Vv*, Vw*) are corrected, whereby the compensated phase voltage commands Vph1* (Vu1*, Vv1*, Vw1*) are generated.

The voltage command correction unit 255 performs voltage compensation processing for the phase voltage commands Vph1* (Vu1*, Vv1*, Vw1*) after the balance compensation, using the compensation value Vcmp for compensating dead time error as in embodiment 1. Thus, the phase voltage commands Vph* compensated by the balance compensation value Vcmp2 and the dead time compensation value Vcmp are outputted to the PWM control unit 50B.

Figure 13:
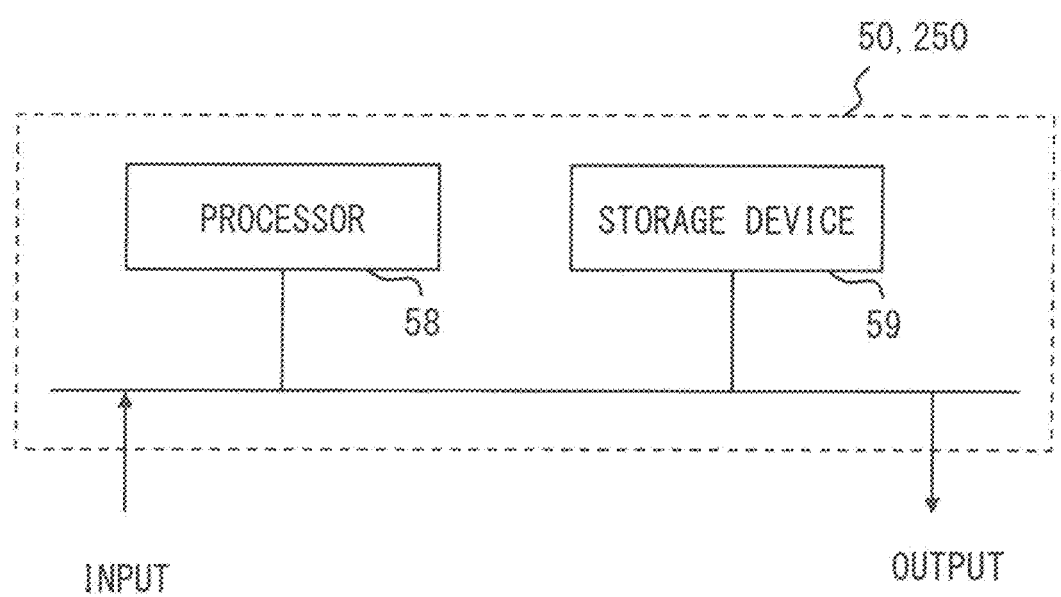
FIG. 13 shows an example of a hardware configuration of the control device.

FIG. 13 shows an example of hardware of the control device 50, 250 described in embodiments 1 and 2.

The control device 50, 250 described in embodiments 1 and 2 includes a processor 58 and a storage device 59, as shown in the hardware example in FIG. 13. The storage device 59 is provided with a volatile storage device such as a random access memory and a nonvolatile auxiliary storage device such as a flash memory (not shown).

Instead of the flash memory, an auxiliary storage device of a hard disk may be provided. The processor 58 executes a program inputted from the storage device 59. In this case, the program is inputted from the auxiliary storage device to the processor 58 via the volatile storage device. The processor 58 may output data such as a calculation result to the volatile storage device of the storage device 59, or may store such data into the auxiliary storage device via the volatile storage device.

As described above, it is also possible to perform control of the power converter by software processing, whereby the control can be implemented at low cost.

In the control unit for the power converter according to the present embodiment configured as described above,
 a balance compensation value as the compensation value is set for compensating potential variation at the voltage-division point of the DC circuit unit so that a first potential difference between the voltage-division point and the positive side of the DC circuit unit and a second potential difference between the voltage-division point and the negative side of the DC circuit unit become equal to each other, and
 the balance compensation value is set to be invalid in a case of the 2-level operation mode, and is set to be valid in a case of the 3-level operation mode.

As described above, in the switchover control, the voltage command correction unit in the present embodiment switches the compensation value for compensating error between the voltage command and AC voltage, between a case of the 2-level operation mode and a case of the 3-level operation mode, as in embodiment 1. Then, the balance compensation value for compensating the potential variation at the voltage-division point of the DC circuit unit as the compensation value in the present embodiment is set to be invalid in a case of the 2-level operation mode, and is set to be valid in a case of the 3-level operation mode.

Therefore, also in the present embodiment, between a case of the 2-level operation and a case of the 3-level operation, the compensation value according to the operation state is switched. That is, the balance compensation value for suppressing voltage variation at the voltage-division point of the DC power supply unit which is a problem in the configuration in a case of the 3-level operation mode is made valid and used only in a case of the 3-level operation. Thus, it becomes possible to suppress error variation between the voltage command value and the output voltage of the power converter before and after level switchover. Further, in a case of the 3-level operation, voltage variation at the voltage-division point of the DC power supply unit is suppressed, whereby error variation between the voltage command value and the output voltage can be further suppressed.

In the control unit for the power converter according to the present embodiment configured as described above,
 in the switchover control, addition or subtraction of the balance compensation value to or from the voltage command is determined on the basis of a polarity of voltage variation at the voltage-division point based on a deviation between the first potential difference and the second potential difference, and a polarity of a power supply direction for the AC circuit unit, and the voltage command is corrected by the determined addition or subtraction of the balance compensation value.

As described above, whether to add or subtract a balance compensation amount to or from the voltage command is determined on the basis of the voltage value at the voltage-division point which is the intermediate potential of the DC circuit unit and the polarity of the power supply direction for the AC circuit, whereby voltage error occurring due to the dead time and the like can be appropriately compensated. Thus, it becomes possible to suppress variation in each phase current and also suppress variation in output torque.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

SW switching element (semiconductor element)
SW1, SW1pU, SW1pV, SW1pW switching element (first switching element)
SW2, SW2nU, SW2nV, SW2nW switching element (second switching element)
SW3, SW3xU, SW3yU, SW3xV, SW3yV, SW3xW, SW3yW switching element (third switching element)
DxU, DyU, DxV, DyV, DxW, DyW diode (semiconductor element)
SWA bidirectional switch 10 DC circuit unit
21 first arm
22 second arm
30 AC rotary machine (AC circuit unit)
50 control device (control unit)
100, 100e, 200 power conversion device

The invention claimed is:

1. A controlling circuitry for a power converter which has a plurality of semiconductor elements for controlling conduction and interruption on a power supply path, between a DC circuit and an AC circuit, and converts DC power from the DC circuit to AC power for the AC circuit, wherein
the controlling circuitry has
a 3-level operation mode of outputting AC voltage composed of 3-level voltages at a positive side and a negative side of the DC circuit and a voltage-division point of DC voltage between the positive side and the negative side of the DC circuit by performing ON/OFF control of the semiconductor elements on the basis of an output voltage command, and
a 2-level operation mode of outputting AC voltage composed of 2-level voltages at the positive side and the negative side of the DC circuit by performing ON/OFF control of the semiconductor elements on the basis of the output voltage command, and
the controlling circuitry performs switchover control for switching between the 2-level operation mode and the 3-level operation mode on the basis of a level specification signal, and in the switchover control, switches a compensation value for compensating error between the voltage command and AC voltage, between a case of the 2-level operation mode and a case of the 3-level operation mode.

2. The controlling circuitry for the power converter according to claim 1, wherein
the controlling circuitry performs the switchover control only in a phase range where current values for all phases in the AC circuit are outside a first threshold range centered at 0.

3. The controlling circuitry for the power converter according to claim 2, wherein
a dead time compensation value for compensating dead time error in the power converter is set as the compensation value.

4. The controlling circuitry for the power converter according to claim 3, wherein
in the switchover control, the controlling circuitry determines addition or subtraction of the dead time compensation value to or from the voltage command in accordance with a polarity of phase current in the AC circuit, and corrects the voltage command by the addition or subtraction of the dead time compensation value.

5. The controlling circuitry for the power converter according to claim 4, wherein
the dead time compensation value is determined in accordance with at least one of a frequency of a carrier signal in PWM for performing ON/OFF control of the semiconductor elements or phase current in the AC circuit.

6. The controlling circuitry for the power converter according to claim 4, wherein
a balance compensation value as the compensation value is set for compensating potential variation at the voltage-division point of the DC circuit so that a first potential difference between the voltage-division point and the positive side of the DC circuit and a second potential difference between the voltage-division point and the negative side of the DC circuit become equal to each other, and
the balance compensation value is set to be invalid in a case of the 2-level operation mode, and is set to be valid in a case of the 3-level operation mode.

7. The controlling circuitry for the power converter according to claim 3, wherein
a balance compensation value as the compensation value is set for compensating potential variation at the voltage-division point of the DC circuit so that a first potential difference between the voltage-division point and the positive side of the DC circuit and a second potential difference between the voltage-division point and the negative side of the DC circuit become equal to each other, and
the balance compensation value is set to be invalid in a case of the 2-level operation mode, and is set to be valid in a case of the 3-level operation mode.

8. The controlling circuitry for the power converter according to claim 2, wherein
a balance compensation value as the compensation value is set for compensating potential variation at the voltage-division point of the DC circuit so that a first potential difference between the voltage-division point and the positive side of the DC circuit and a second potential difference between the voltage-division point and the negative side of the DC circuit become equal to each other, and
the balance compensation value is set to be invalid in a case of the 2-level operation mode, and is set to be valid in a case of the 3-level operation mode.

9. The controlling circuitry for the power converter according to claim 1, wherein
a dead time compensation value for compensating dead time error in the power converter is set as the compensation value.

10. The controlling circuitry for the power converter according to claim 3, wherein
in the switchover control, the controlling circuitry determines addition or subtraction of the dead time compensation value to or from the voltage command in accordance with a polarity of phase current in the AC circuit, and corrects the voltage command by the addition or subtraction of the dead time compensation value.

11. The controlling circuitry for the power converter according to claim 10, wherein
the dead time compensation value is determined in accordance with at least one of a frequency of a carrier signal in PWM for performing ON/OFF control of the semiconductor elements or phase current in the AC circuit.

12. The controlling circuitry for the power converter according to claim 11, wherein
a balance compensation value as the compensation value is set for compensating potential variation at the voltage-division point of the DC circuit so that a first potential difference between the voltage-division point and the positive side of the DC circuit and a second potential difference between the voltage-division point and the negative side of the DC circuit become equal to each other, and
the balance compensation value is set to be invalid in a case of the 2-level operation mode, and is set to be valid in a case of the 3-level operation mode.

13. The controlling circuitry for the power converter according to claim 10, wherein a balance compensation value as the compensation value is set for compensating potential variation at the voltage-division point of the DC circuit so that a first potential difference between the voltage-division point and the positive side of the DC circuit and a second potential difference between the voltage-division point and the negative side of the DC circuit become equal to each other, and the balance compensation value is set to be invalid in a case of the 2-level operation mode, and is set to be valid in a case of the 3-level operation mode.

14. The controlling circuitry for the power converter according to claim 9, wherein
the dead time compensation value is determined in accordance with at least one of a frequency of a carrier signal in PWM for performing ON/OFF control of the semiconductor elements or phase current in the AC circuit.

15. The controlling circuitry for the power converter according to claim 14, wherein
a balance compensation value as the compensation value is set for compensating potential variation at the voltage-division point of the DC circuit so that a first potential difference between the voltage-division point and the positive side of the DC circuit and a second potential difference between the voltage-division point and the negative side of the DC circuit become equal to each other, and
the balance compensation value is set to be invalid in a case of the 2-level operation mode, and is set to be valid in a case of the 3-level operation mode.

16. The controlling circuitry for the power converter according to claim 9, wherein
a balance compensation value as the compensation value is set for compensating potential variation at the voltage-division point of the DC circuit so that a first potential difference between the voltage-division point and the positive side of the DC circuit and a second potential difference between the voltage-division point and the negative side of the DC circuit become equal to each other, and
the balance compensation value is set to be invalid in a case of the 2-level operation mode, and is set to be valid in a case of the 3-level operation mode.

17. The controlling circuitry for the power converter according to claim 1, wherein
a balance compensation value as the compensation value is set for compensating potential variation at the voltage-division point of the DC circuit so that a first potential difference between the voltage-division point and the positive side of the DC circuit and a second potential difference between the voltage-division point and the negative side of the DC circuit become equal to each other, and
the balance compensation value is set to be invalid in a case of the 2-level operation mode, and is set to be valid in a case of the 3-level operation mode.

18. The controlling circuitry for the power converter according to claim 17, wherein
in the switchover control, the controlling circuitry determines addition or subtraction of the balance compensation value to or from the voltage command on the basis of a polarity of voltage variation at the voltage-division point based on a deviation between the first potential difference and the second potential difference, and a polarity of a power supply direction for the AC circuit, and corrects the voltage command by the determined addition or subtraction of the balance compensation value.

19. A power conversion device comprising:
the controlling circuitry for the power converter according to claim 1; and
the power converter, wherein
the power converter includes
a first arm for at least one phase of the AC circuit, the first arm being connected in parallel between the positive side and the negative side of the DC circuit and being formed by connecting a first semiconductor switch and a second semiconductor switch as the semiconductor elements in series, and
a second arm which has a bidirectional switch formed by the semiconductor element and is connected between an AC terminal and the voltage-division point of the DC circuit, the AC terminal being a connection point of the first semiconductor switch and the second semiconductor switch,
the bidirectional switch has diodes and third semiconductor switches as the semiconductor elements, and is configured such that the third semiconductor switches to which the diodes are connected in anti-parallel are connected in anti-series or series circuits each formed by connecting the diode and the third semiconductor switch in series are connected in anti-parallel, and
the controlling circuitry performs ON/OFF control of the semiconductor elements by performing PWM on the basis of the voltage command and a carrier signal, and performs the switchover control in synchronization with a set timing in the carrier signal.

20. The power conversion device according to claim 19, wherein
in a phase range where the voltage command is positive, the controlling circuitry performs the switchover control at a timing of a bottom of the carrier signal as the set timing in the carrier signal, and
in a phase range where the voltage command is negative, the controlling circuitry performs the switchover control at a timing of a top of the carrier signal as the set timing in the carrier signal.

* * * * *